United States Patent [19]

Molnar et al.

[11] Patent Number: 5,555,674

[45] Date of Patent: * Sep. 17, 1996

[54] SOD MATS CONSTRUCTED OF STABLE FIBERS AND DEGRADABLE MATRIX MATERIAL AND METHOD FOR PROPAGATION

[75] Inventors: Charles J. Molnar; Judith R. Molnar, both of 12 Malvern Ct., Devon, Wilmington, Del. 19810; William H. Mitchell, Newark, Del.

[73] Assignees: Charles J. Molnar; Judith R. Molnar, both of Wilmington, Del.

[*] Notice: The term of this patent shall not extend beyond the expiration date of Pat. No. 5,344,470.

[21] Appl. No.: 297,231

[22] Filed: Aug. 29, 1994

Related U.S. Application Data

[63] Continuation-in-part of Ser. No. 95,651, Jul. 29, 1993, Pat. No. 5,344,470.

[51] Int. Cl.⁶ .................................................. A01G 1/00
[52] U.S. Cl. ..................................... 47/56; 47/1.01; 47/58
[58] Field of Search ............................... 47/56, 58, 1.01; 111/901, 902; 428/236, 264, 290, 284

[56] References Cited

U.S. PATENT DOCUMENTS

| 3,516,196 | 6/1970 | Lippoldt | 47/56 |
| 3,557,491 | 1/1971 | Franklin et al. | 47/56 |
| 3,863,388 | 2/1975 | Loads | 47/56 |
| 3,890,739 | 6/1975 | Blackburn | 47/56 |
| 3,905,313 | 9/1975 | Grether | 111/901 |
| 3,914,901 | 8/1975 | Muldner | 47/56 |
| 3,980,029 | 9/1976 | Huggett | 111/901 |
| 4,023,506 | 5/1977 | Robey | 111/1 |
| 4,062,145 | 12/1977 | Gidge | 47/9 |
| 4,190,981 | 3/1980 | Muldner | 47/56 |
| 4,336,668 | 6/1982 | Decker | 47/58 |
| 4,342,807 | 8/1982 | Rasen et al. | 428/180 |
| 4,539,038 | 9/1985 | Gombert | 71/64.11 |
| 4,584,790 | 4/1986 | Gaughen | 47/56 |
| 4,724,781 | 2/1988 | Higashimura et al. | 47/56 |
| 4,786,550 | 11/1988 | McFarland et al. | 428/203 |
| 4,916,855 | 4/1990 | Halliday et al. | 47/56 |
| 4,934,094 | 6/1990 | Walton | 47/56 |
| 4,941,282 | 7/1990 | Milstein | 47/56 |
| 4,986,026 | 1/1991 | Decker | 47/56 |
| 5,189,833 | 3/1993 | Clark | 47/56 |
| 5,205,068 | 4/1993 | Solomou | 47/56 |
| 5,224,290 | 7/1993 | Molnar et al. | 47/56 |
| 5,224,292 | 7/1993 | Anton | 47/64 |
| 5,301,466 | 4/1994 | Egan | 47/58 |
| 5,344,470 | 9/1994 | Molnar et al. | 47/58 |
| 5,345,713 | 9/1994 | Molnar et al. | 47/56 |
| 5,346,514 | 9/1994 | Molnar et al. | 47/58 |
| 5,489,317 | 2/1996 | Bergevin | 47/1.01 |

FOREIGN PATENT DOCUMENTS

| 2630293A | 10/1989 | France . |
| 2408518 | 2/1974 | Germany . |
| 3130019A | 10/1989 | Japan . |
| 1541234A | 11/1987 | U.S.S.R. . |
| WO94/00639 | 1/1994 | WIPO . |

OTHER PUBLICATIONS

Organic Gardening, Sep. Oct. 1990 pp. 47–49 "Something Wild" by Jeff Cox.
HortScience, 18(1), pp. 89–91, 1983 "Developing Wildflower Sods" by Airhart et al.
HortScience, 12(5), pp. 492–494 "The Production of Ground Covers in a Sod–Like Manner" by Sterrett et al.
Proceedings of the International Plant Propagators Society, V25, 1975, pp. 408–412 "GroundCover Sods . . . " by Sterrett et al.
Cooperative Extension Service, Univ of Del., 1974 "Sod Production with Plastic Netting" by Mitchell et al.

Primary Examiner—James R. Feyrer

[57] ABSTRACT

New sod mats are described. The sod mats are reinforced with a coherent sheet of stable fibers and degradable matrix material. The sod reinforcements are easy to manufacture and handle. The sod mats have good of handling characteristics, good sod mat propagation characteristics, good "shelf life" stability, and are more easily dispersed into the soil by rototilling or other means when the mats are no longer useful as sods. Sod mats of grasses, ornamental plants, and nutritional plants are disclosed. The method of propagation is disclosed.

43 Claims, 9 Drawing Sheets

SOD MATS CONSTRUCTED OF STABLE FIBERS AND DEGRADABLE MATRIX MATERIAL AND METHOD FOR PROPAGATION

This is a continuation in part of application Ser. No. 08/095,651 filed on Jul. 21, 1993 now U.S. Pat. No. 5,344,470 and is included herein by reference.

This invention relates to sod mats reinforced with a coherent sheet of stable fibers and a degradable matrix material. The sod reinforcement is easily manufactured and handled. The sod reinforcement aids propagation of sod mats with early harvest, ease of handling and ease of ultimate disposal.

BACKGROUND OF INVENTION

Reinforced sods have long been known in the art. Sod mats of groundcovers, flowers, and playing field grasses are among the examples.

Molnar (U.S. Pat. No. 5,224,290) discloses flower and groundcover sod mats reinforced with nylon sod reinforcements. Decker (U.S. Pat. No. 4,986,026) discloses tall fescue sod mats which are very large and employ planting mediums containing straw and sewage sludge. Molnar (Application Ser. No. 07/745224) discloses flower and groundcover sod mats reinforced with polypropylene sod reinforcements. Milstein (U.S. Pat. No. 4,941,282) discloses wildflower sod mats reinforced with polyester fabrics. McFarland (U.S. Pat. No. 4,786,550) discloses a lightweight seed mat formed with melt blown nonwovens. Walton (U.S. Pat. No. 4,934,094) discloses a grass sod reinforced with netting. Decker (U.S. Pat. No. 4,336,668) discloses a novel method of growing groundcover sods reinforced with synthetic netting. Muldner (U.S. Pat. No. 4,190,981) discloses a complex lightweight seed mat using complex expensive equipment. Airhart in HortScience 18(1), 89–91, 1983 discloses groundcover and flower sods reinforced with synthetic netting.

In general, sod mats reinforced with synthetic spunbond fabrics are excellent all purpose sod mats. They have very good sod mat production characteristics, good strength and are easy to handle. The current synthetic spunbond reinforced sod mats use the inherent strength of the synthetic fabric to reinforce them. This often results in higher synthetic resin consumption and other limitations discussed herein.

Sod mats employing natural reinforcements such as straw, bark, or water sensitive glues can decompose prematurely if harvest time or retail is delayed or if the planting medium is particularly biologically active. Furthermore, rate of degradation is generally difficult to control because of random environmental effects.

Sod mats employing synthetic netting for reinforcement can produce good sod mats. They do however, suffer from some important drawbacks. If the netting openings are large, harvest is usually delayed, while if the netting openings are small, the roots of the plants can be girdled. Neither leads to sod mats with both optimum sod mat production and growing characteristics. If the netting openings are large, the netting can also be troublesome to completely cover with planting medium.

In view of the above prior art, there still exists a need for sod mats with improved ease of ultimate disposal and improved garden friendliness. There still is a need for sod mats with the advantages of early harvest time, good "shelf life" stability, and easy handling and propagation. If the sod reinforcement degrades over time, there is a need to maintain good sod mat handling characteristics and "shelf life" stability. Furthermore, sod mats which place reduced demands on the strength of the stable fiber reinforcement are needed to reduce the stable fiber consumption and in general, to reduce costs. There exists a need for these new sod mats to be made with sod reinforcements which are easy to manufacture and handle in different and useful types of constructions. Objects of the current invention are then to develop sod mats with a select group of preferred sod reinforcements which are readily manufactured and are easy to handle. Another object of this invention is to develop sod mats that are easy to handle, have good "shelf life" stability, and place reduced demands on the stable fibers in the sod reinforcement. Another object of the invention is to develop sod mats with improved control of degradation which generally aids "shelf life" stability, garden friendliness, and ultimate disposal. It is also an object of this invention to develop a manufacturing process for these sod mats with good production characteristics.

Other objects and advantages of the current invention will become more apparent to those skilled in the art in view of the following description and examples.

BRIEF DESCRIPTION OF DRAWING FIGURES

A brief description of the figures and reference numerals follows.

REFERENCE NUMERALS IN DRAWINGS

Figure 1:
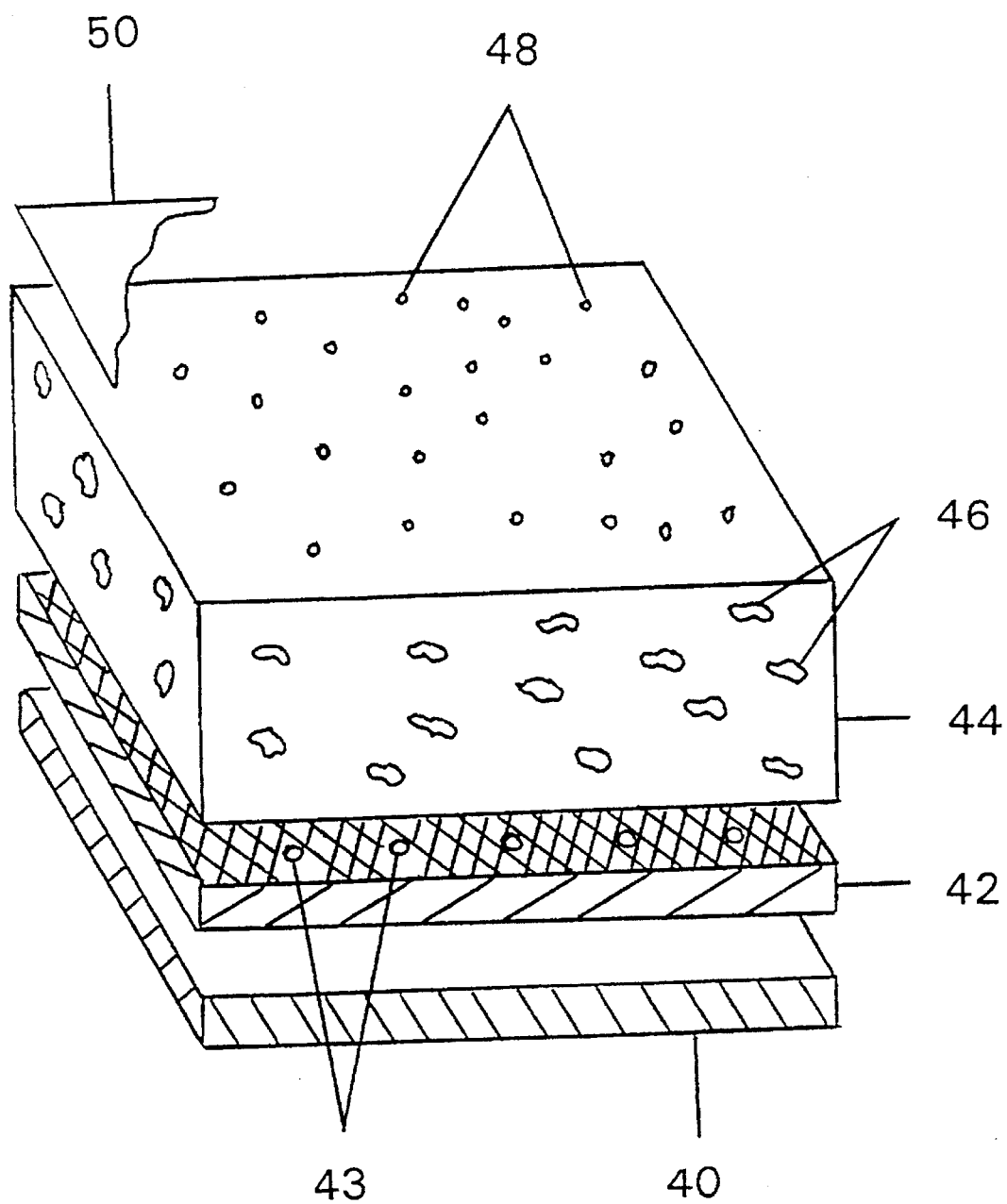
FIG. 1 is a simplified perspective view of a newly planted sod mat.

40. Surface sod mat is growing on.
42. Sod reinforcement
43. Apertures in the sod reinforcement
44. Planting medium
46. Planting medium amendments such as wood chips, hay, straw, and the like.
48. Plant starting material
50. Crop cover
52. Mature plants ready for harvest
54. Mature plant roots
56. Mature plant roots penetrating the sod reinforcement 58. Stable fibers of sod reinforcement 59. Degradable matrix material of sod reinforcement 60. Lower layer of paper reinforcement 62. Upper layer of paper reinforcement 70. Prepare flat for planting.

72. Install sod reinforcement.

74. Install planting medium. Add planting medium amendments as desired.

76. Add plant starting material.

78. Keep moist and add appropriate planting amendments. Allow to mature into a sod in 1–18 months.

80. Harvest.

82. Prepare field for weed guards and lay down plastic film.

84. Install bed edging.

100. Two hands lifting sod mat.

102. Transverse direction.

104. Machine direction.

106. Mature plants in harvested sod mat.

108. Mature sod mat.

110. Two hands attempting to lift weathered sod reinforcement.

112. Weathered sod reinforcement.

114. Duct tape taped to end of the weathered sod reinforcement.

116. Lattice holding sod reinforcement to two by four.

118. Screws holding lattice to two by four.

120. Wooden two by four.

SUMMARY OF THE INVENTION

Our invention is a new plant sod mat comprising a sod reinforcement wherein said sod reinforcement is comprised of a coherent sheet of stable fibers and a layer of planting medium of greater than 1.5 cm thick on said sod reinforcement and containing viable plants growing in said planting medium and whose roots penetrate and entangle with said sod reinforcement and thus form said sod mat with a weight per unit area of greater than 6 kgpsm. Sod reinforcements of this invention wherein 15% of said degradable matrix material are preferred and sod reinforcements of this invention wherein 25% of said degradable matrix material are more preferred and sod reinforcements of this invention wherein 50% of said degradable matrix material are even more preferred and sod reinforcements of this invention wherein 75% of said degradable matrix material are most preferred. Sod mats wherein the sod mat is substantially reinforced with plant roots penetrating and entangling with sod reinforcement are preferred. Sod mats with a Mutual Reinforcement Ratio of greater than 1.5 are more preferred and sod mats with a Mutual Reinforcement Ratio of greater than 2 are even more preferred. Sod reinforcements with stable fiber basis weight of less than or equal to about 70 gpsm are preferred and sod reinforcements with stable fiber basis weight of less than or equal to 40 gpsm is more preferred and sod reinforcements with stable fiber basis weight of less than 20 gpsm is even more preferred.

Another embodiment of our invention is a new plant sod mat comprising a sod reinforcement wherein said sod reinforcement is comprised of a coherent sheet of stable fibers and degradable matrix material and a layer of planting medium on said sod reinforcement and containing viable plants growing in said planting medium and whose roots penetrate and entangle with said sod reinforcement and thus, form a sod mat. Sod reinforcements of this invention preferably have from about 1% to 99% stable fibers by weight and more preferably from about 2% to 98% stable fibers by weight and even more preferably from about 10% to 95% stable fibers by weight. Sod reinforcements of this invention preferably have from about 99% to 1% degradable matrix material by weight and more preferably from about 98% to 2% degradable matrix material by weight and even more preferably from about 90% to 5% degradable matrix material by weight. In one preferred embodiment of our invention, said stable fibers preferably comprise stable synthetic thermoplastic fibers and more preferably said stable fibers comprise fiber resins selected from the group consisting of nylon and polyolefin resins and even more preferably said stable fibers comprise polyolefin fibers. In another preferred embodiment of our invention said stable fibers comprise inorganic fibers and even more preferably said stable fibers comprise glass fibers.

Based on our instant invention, we have by figures, explanation, and example shown how to effectively grow these sod mats to specific customer needs.

DESCRIPTION OF PREFERRED EMBODIMENTS-FIGS. 1–3

FIG. 1 is a fragmentary cross section of a typical sod mat according to this invention. A sod mat of this invention is a plant sod mat which is reinforced with a sod reinforcement wherein the sod reinforcement is comprised of a coherent sheet of stable fibers and degradable matrix material. Reference Numeral 40 is a suitable surface on which to grow sod mats such as a heavy (e.g. 6 mil) black polyethylene film. Other surfaces such as plywood, heavy perforated plastic film, rubber sheets, or concrete may also be used. In a field grown application, the sod growing surface prevents weeds from growing into and through the sod mat from below and also encourages the plant roots to grow laterally and entangle with the sod reinforcement and thus, form a sod mat. In a flat grown application, the bottom of the flat normally serves as the sod mat growing surface. Good drainage in the flat is important. Reference Numeral 42 is the sod reinforcement. Reference Numeral 43 represents apertures which facilitate good water infiltration useful for some sod reinforcements. Reference 44 is the planting medium. The planting medium is adjusted to the optimum depth for the particular plant species. For sod mats of this invention, generally low density planting mediums are employed such as REDI-EARTH® and METRO-MIX® manufactured by W. R. Grace or FAIRGROW® manufactured by Delaware Solid Waste Authority of Wilmington, DE. Composted waste products are particularly useful because of their general low cost and light weight. Further examples of suitable planting mediums are disclosed in patents U.S. Pat. No. 4,720,935 by Rogers et. al., U.S. Pat. No. 4,934,094 by Walton, U.S. Pat. No. 4,941,282 by Milstein, and U.S. Pat. No. 4,986,026 by Decker and are included by reference. Soil can also be used effectively. Light weight planting mediums are particularly preferable and have a dry volume density below 700 grams per liter dry weight and more preferably below 500 grams per liter dry weight. Planting mediums with a dry volume density of greater than or equal to about 150 grams per liter dry weight are preferred. Examples of planting medium amendments are represented by Reference Numeral 46 and include but are not limited to fertilizers, lime, hydrogels, PERLITE®, wood chips, hay, and straw and are well known in the art. Reference Numeral 48 represents the plant starting materials. Representative plant starting materials include seeds, seedlings, plant plugs, rooted cuttings, root divisions, cuttings, rhizomes, and viable plant materials derived from plant tissue cultures and the like. Seedlings, rooted cuttings and the like are spaced according to the particular plant species but normally are spaced on a 5 to 20 cm grid pattern. Seeding rates also depend on the specific plant species or specific mixture of species but normally are from about 0.3 to 80 lbs per acre. Reference Numeral 50 represents optional crop cover which can aid early germination and give some protection from marauding birds.

Figure 2:
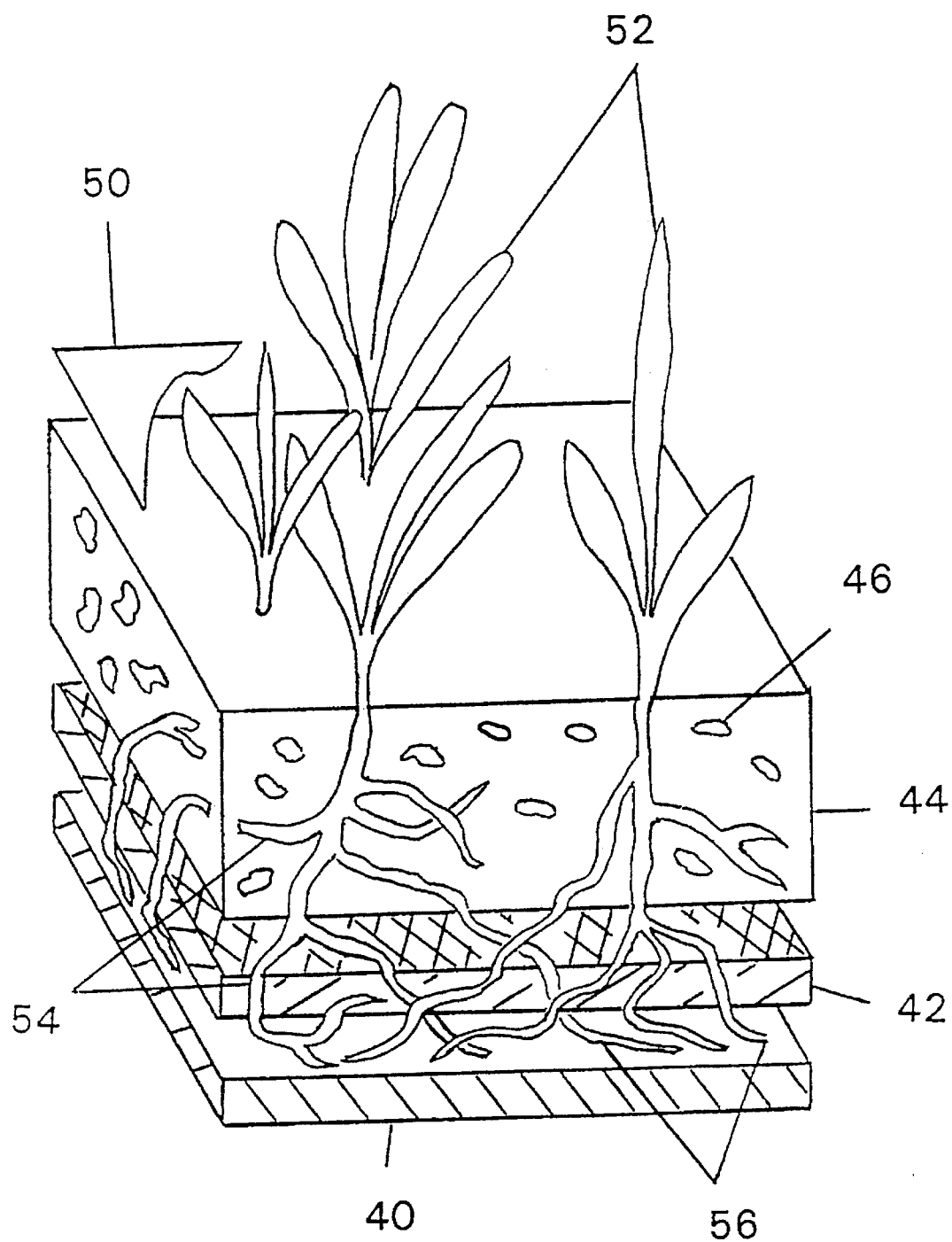
FIG. 2 is a simplified perspective view of a sod mat ready for harvest.

FIG. 2 is a fragmentary cross section of a mature sod mat according to this invention. Reference 40 is a suitable surface on which to grow sod mats. Reference Numeral 42 is the sod reinforcement. Reference Numeral 44 is the planting medium layer. The planting medium layer is preferably greater than 1.6 cm thick and more preferably greater than 2 cm thick and even more preferably greater than 2.2 cm thick. The planting medium is preferably less than 7 cm thick and more preferably less than 6 cm thick and even more preferably less than 5 cm thick. The planting medium thickness is adjusted to the preferable depth of the particular plant species, to facilitate good root growth and proper water/nutrient retention. Reference Numeral 50 represents an optional crop covers such as hay or well known non-woven fabric crop covers to give some over wintering protection. Reference Numeral 52 depicts the mature plants ready for harvest. A preferred class of plants is nutritional plants which is comprised of herbs and vegetables. Representative examples of nutritional sod mats include sods of thyme and cherry tomatoes. Another preferred class of plants is ornamental plants which is comprised of flowers and groundcovers. Representative ornamental plant examples include bedding plants, liriope spicata, ivy, cosmos, and hostas. An especially preferred class of ornamental plants is comprised of wildflowers. A particularly preferred class of plants is garden plants which consists of nutritional and ornamental plants. Another preferred class of plants is grasses. Specialty grasses is a preferred class of grasses which is comprised of bunch grasses and shade grasses. Representative examples of bunch grasses are perennial rye grass and tall fescue grass. Reference Numeral 54 depicts the roots of the mature plants penetrating and entangled with each other and the sod reinforcement. Reference Numeral 56 are the plant roots which penetrate the sod reinforcement. This root penetration and entanglement is often mutually reinforcing to both the plant roots and the reinforcement and makes these very low strength sod reinforcements so useful and advantageous as will be discussed below.

Figure 3:
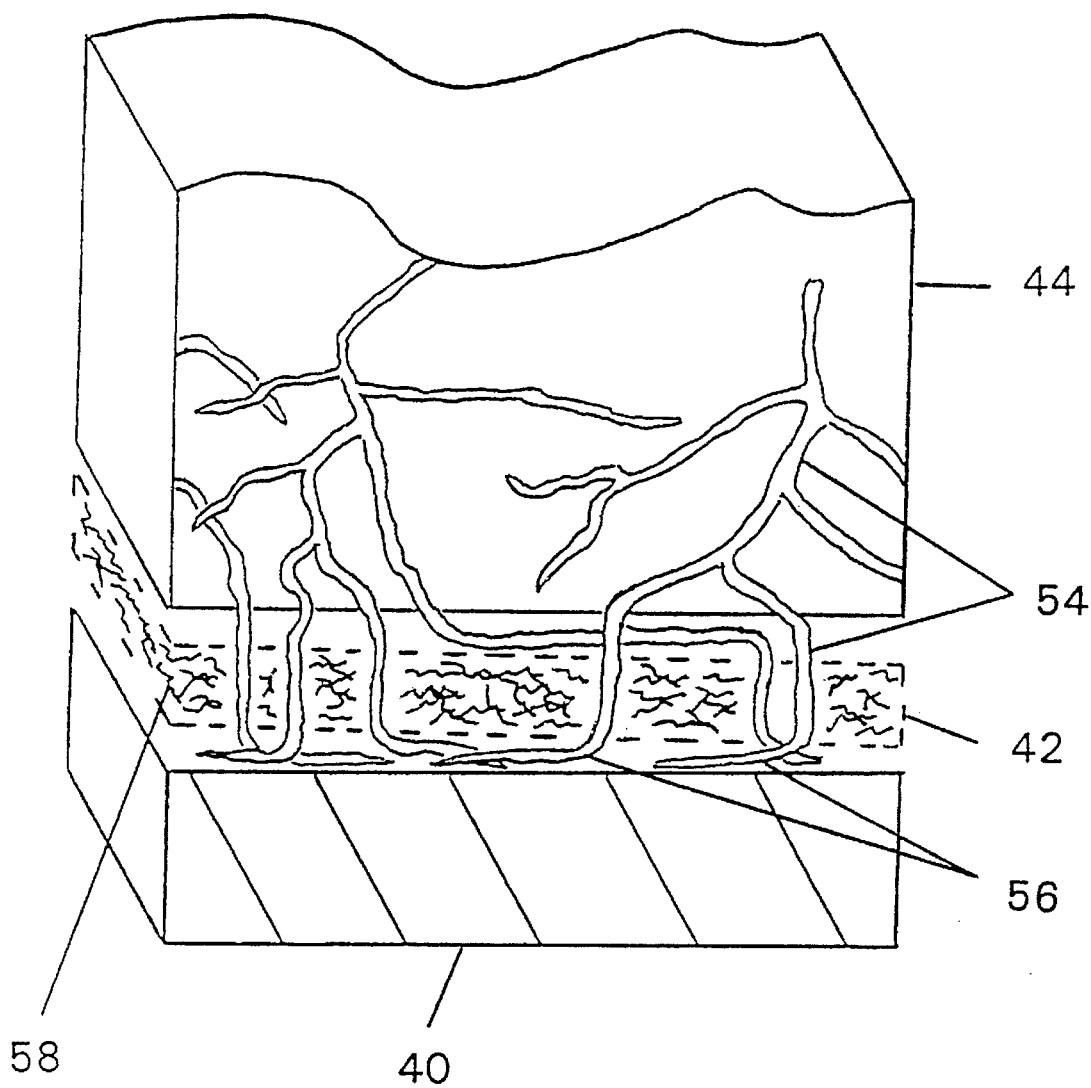
FIG. 3 is an artist's conception of the important root penetration in a sod mat.

FIG. 3 is an artist's expanded view of a mature sod mat according to this invention to better show some of the key characteristics. Reference Numeral 40 represents the sod mat growing surface. Reference Numeral 42 is the sod reinforcement. Reference Numeral 44 represents the planting medium. Reference Numeral 54 represents the plant roots of the sod ready for harvest which bind the planting medium to the sod reinforcement. Reference Numeral 56 are the plant roots which penetrate the sod reinforcement. In a preferred embodiment, the plant roots penetrate the sod reinforcement and entangled with each other. Reference Numeral 58 are the stable fibers of the sod reinforcement. In this artist's expanded view of a mature sod mat the degradable matrix material has degraded during the propagation period and thus, is not shown.

It has long been recognized that sod mats which promote earlier harvest times are needed in the industry. In addition, there is a need for sod mats which place lower strength demands on the stable fibers of the sod reinforcement while maintaining good "shelf life" stability and ease of handling characteristics. We have found that new and useful sod mats can be grown with heretofore unheard of low quantities of stable fiber reinforcement in the sod reinforcements by producing sod mats which unexpectedly combine the strength of the stable fibers of the sod reinforcement with the plant roots to form sod mats which can be harvested early. We have also discovered that sod mats of this invention can be propagated with a matrix of stable fibers which is so weak that it is difficult to manufacture and/or handle without the added reinforcement of a degradable matrix material. Still furthermore, as the degradable matrix material deteriorates during the propagation and retail sale period, the plant root penetration and entanglement replaces and reinforces the remaining stable fiber matrix to form a useful reinforced sod mat. Sod mats of this invention have three surprising and unique advantages heretofore not combined in any one sod mat. Advantage one, the sod reinforcement comprising stable fibers is reinforced with degradable matrix materials to facilitate ease of manufacture of a coherent sheet of sod reinforcement. The coherent sheet of sod reinforcement also facilitates handling and installation of the sod reinforcement in field and flat grown applications. Advantage two, as the degradable matrix material starts to decompose during propagation of the sod mat, the plant:roots penetrate and entangle with the stable fibers of the sod reinforcement to reinforce and form sod mats early which are easy to handle and generally require lower quantities of stable fiber reinforcement. In some sod mats, the plant roots also penetrate and entangle with the degradable matrix material, particularly when the degradable matrix material is in fiber form, and this further temporarily enhances the sod mat strength. Further more, as the degradable matrix material decomposes, many of the sod reinforcements become increasingly porous which also facilitates root penetration and entanglement. It also improves water infiltration. The mutual plant root reinforcement with the stable fibers continues to improve during the retail sale period improving "shelf life" stability. The degree of decomposition of the degradable matrix material during propagation will be discussed further below. Advantage three, after these sod mats have performed their useful purpose, they can be rototilled or dispersed into the garden soil where the roots and any remaining degradable matrix material further decompose and the small amount of remaining stable fibers are more easily dispersed in the garden soil. This improves garden friendliness. Sod reinforcements of this invention comprise a coherent sheet of stable fibers temporarily reinforced with a degradable matrix material to promote ease of manufacture and handling of the sod reinforcements. Sod reinforcements are preferably thin to facilitate handling and storage before use. Sod reinforcements are preferably less than about 3 mm thick and more preferably less than 2 mm thick and even more preferably less than 1 mm thick and most preferably less than 0.5 mm thick. Within this specification, stable fibers are defined as any fibers which will not decompose significantly over the normal propagation and retail sale period of the sod mat. A representative class of stable fibers is stable synthetic thermoplastic fibers. Representative stable synthetic thermoplastic fibers are fibers such as nylon, polyester, or polyolefin fibers. Another representative class of stable fibers are inorganic fibers. A representative example of inorganic fibers are fibers comprised of glass.

By combining the strength of the plant roots and the sod reinforcement we have discovered that surprising and valuable benefits heretofore unknown in reinforced sod mats are possible. By propagating the sod mats in a way which effectively uses both the strength of the plant roots and the sod reinforcements we have found that "shelf life" stability is very good. Heretofore, sod mats wherein the sod reinforcement deteriorated did not have the surprising versatility of earlier harvest combined with the good "shelf life" of the new sod mats of this invention. By using the biodegradable plant root structure to actively help reinforce the sod mats, while the plants are alive, the biodegradable root reinforcement not only remains strong but also gains strength through aging by normal growth and increased entanglement with the sod reinforcement. It is only when the sod mat plants are killed by rototilling or other selected means that the biodegradation of the roots begin. After the plant sod mat has served its purpose and it is time to disperse the sod mat in the garden soil, the sod mat can often be rototilled or otherwise dispersed in the garden soil with a minimum of effort. This is particularly important for a garden friendly sod mat. When using a sod reinforcement which is comprised of stable fibers which are not entangled with each other nor permanently chemically or thermally bonded to one another as illustrated in Examples 2 and 6 below, the advantages of sod mats of this invention are especially apparent. Without the degradable matrix material, the manufacture and handling of the sod reinforcements in Examples 2 and 6 would be very difficult. Without the mutual reinforcement of the plant roots with the stable fibers, versatile sod mats with early production and good handling characteristics would not be produced. The biodegradation of the roots after rototilling or other wise killing of the plants improves the ease of dispersal of the remaining loose, stable fibers and any remaining degradable matrix material into the garden soil. Heretofore, sod reinforcement sheets with little or no coherent strength were unknown in the art.

Sod reinforcements of this invention are a coherent sheet of stable fibers and degradable matrix material. One preferred class of sod reinforcements are nonwoven fabrics or webs comprised of stable fibers and degradable matrix material wherein the degradable matrix material is comprised of degradable fibers. These nonwoven fabric or web sod reinforcements promote excellent root penetration and entanglement. We currently believe this is due to the large number of stable fibers dispersed over a relatively uniform area which are available for entanglement and reinforcement. In addition, nonwoven web and fabric sod reinforcements are low cost and readily available. Another preferred class of sod reinforcement is comprised of a stratum of stable fibers and one or more strata of degradable matrix material. An example of this preferred class of sod reinforcement is comprised of a laminate construction of stable fibers and degradable matrix material wherein the stable fibers are preferably sandwiched between or adhered to the degradable matrix material. Loose netting structures wherein the stable fibers or stable fiber bundles are not permanently joined at the stable fiber or stable fiber bundle cross-over points are less prone to girdling of the valuable plant roots as reported by previous researchers for regular synthetic netting. Excellent root penetration generally results because of the very large open structure of the loose netting structures. In addition, these laminate constructions are easy to completely cover with planting medium. Another preferred type of sod reinforcement is a sod reinforcement comprising stable fibers which are substantially encapsulated with degradable matrix material. An example of this structure is a laminated structure discussed herein above. Another preferred type of sod reinforcement is a woven sod reinforcement comprised of stable fibers and degradable matrix material wherein the degradable matrix material is comprised of degradable fibers. Another preferred class of sod reinforcement is a virtual stable fiber structure comprised of stable fibers and degradable matrix material wherein the stable fibers are temporarily bonded or joined at some or most of the stable fiber cross-over points by effectively using degradable matrix material. Virtual stable fiber structures temporarily bonded or joined at about 3% to 100% of the stable fiber cross-over points are preferred and virtual stable fiber structures temporarily bonded at about 10% to 100% of the stable fiber cross-over points are more preferred and virtual stable fiber structures temporarily bonded at about 50% to 100% of the stable fiber cross-over points are even more preferred. Again, these virtual stable fiber structures are less prone to cause root girdling of valuable plant roots because the fibers or roving are only temporarily bonded or joined at the cross-over points and thus become relatively free to move about and facilitate better and faster root penetration. In each of these preferred constructions, the stable fiber constructions are reinforced with degradable matrix material to make handling and field installation of the sod reinforcements much easier. In fact without this degradable matrix material reinforcement of many sod reinforcements of this invention, handling and mechanical installation in the field from farm equipment would be difficult or impossible. In each of these preferred constructions, as the degradable matrix material deteriorates during propagation and the retail sale period, the plant root penetration and entanglement replaces and reinforces the remaining stable fiber matrix to form a useful reinforced sod mat. These embodiments and their advantages will be described further below.

Some representative examples of stable fibers and degradable matrix materials have been discussed. There are preferred classes of degradable matrix material especially useful in this invention. One preferred class of degradable matrix material is degradable fibers. Another preferred class of degradable matrix material is degradable films. Another preferred class of degradable matrix material is degradable adhesives. A preferred class of degradable fibers is cellulosic fibers. One preferred class of cellulosic fibers is native cellulosic fibers. Representative examples of native cellulosic fibers are wood fibers, bast fibers, leaf fibers, and seed fibers. An especially preferred class of native fibers are fibers selected from the group consisting of wood fibers, and seed fibers because of their low cost, ease of processing, and ready availability. Representative wood fibers are hardwood fibers and softwood fibers. Representative seed fibers are cotton fibers. Another preferred class of cellulosic fibers is synthetic cellulosic fibers. A representative example of synthetic cellulosic fibers is rayon fibers. These degradable fibers often decompose during the normal propagation and/ or retail sale period. The remaining stable fibers reinforced with the entangled plant roots retain the "good shelf life" stability, early harvest time advantages, and good handling characteristics of the sod mats. Other examples of degradable matrix materials will be discussed below. Generally, stable fibers and degradable matrix materials are well known to those skilled in the art because the stable fibers such as nylon and polypropylene fibers are known to last for years when buried in soil and degradable matrix materials such as cotton and cellulose are known to readily decompose when buried in soil over a short period and either disappear completely or lose essentially all useful strength. Test methods are, however, sometimes useful. Three useful tests are the Soil Degradation Test Method B-2, soil burial test AATCC Test Method 30-1989 Test 1, and Hydrolysis Test H-1. The soil burial test AATCC Test Method 30-1989 Test 1 correlates with how readily the degradable matrix material will disappear,. or be dispersed in the garden soil after the sod mats have served their purpose and thus aids in predicting garden friendliness. The soil burial test AATCC Test Method 30-1989 Test 1 is the most preferred test for stable fibers and degradable matrix material in this specification because of its value in helping to predict garden friendliness. All stable fibers and degradable matrix material used in sod reinforcements of this invention meet the soil burial test AATCC Test Method 30-1989 Test 1 limitations as defined in this specification. Soil Degradation Test Method B-2 is an aging test we have found useful to aid in screening for garden friendliness. Hydrolysis Test H-1 is used to aid in screening degradable matrix material which is susceptible to hydrolytic degradation. One of ordinary skill in the art can use these test methods in combination with the teachings and examples of this specification for helpful guidance to develop sod reinforcements of this invention to meet specific customer needs.

The preferred test for stable fibers and degradable matrix materials in this specification is soil burial test AATCC Test Method 30-1989 Test 1. The preferred soil is composed of 50% by volume of top soil or leaf mold, 5% by volume of well rotted and shredded cow manure, and 45% by volume of coarse sand. The degradable matrix material and stable fibers are tested by the soil burial test AATCC Test Method 30-1989 Test 1 for set period of time. An exposure period of 40 weeks is used. If the degradable matrix material has decomposed and disappeared or has decomposed and retains no integrity after this 40 week exposure, the matrix material is certainly confirmed as being degradable in this test. If after this exposure the degradable matrix material is still available for testing, it is carefully removed and rinsed and allowed to dry out for 7 days at 23° C. The tensile strength of the exposed suspected degradable matrix material are compared with the same virgin matrix material by the standard ASTM test methods. The suspected degradable matrix material is considered degradable within the meaning of the soil burial test AATCC Test Method 30-1989 Test 1 in this specification if the suspected degradable matrix material loses 70% or more of its initial strength and degradable matrix material which loses 80% or more of its initial strength is more preferable and degradable matrix material which loses 90% or more of its initial strength is even more preferable and degradable matrix material which loses 95% or more of its initial strength is most preferable. The stable fibers are also exposed to the soil burial test. After a 40 week soil burial test exposure the stable fibers are carefully removed and rinsed and allowed to dry out for 7 days at 23° C. The fibers are stable fibers within the meaning of the soil burial test AATCC Test Method 30-1989 Test 1 in this specification if the suspected stable fibers lose less than 70% of their initial strength and stable fibers which lose less than 65% of their initial strength are more preferable and stable fibers which lose less than 60% of their initial strength are even more preferable and stable fibers which lose less than 50% of their initial strength are most preferable. Adhesives are normally tested on the tensile strength of the composite structure such as a laminate or nonwoven fabric. Preferably tests are repeated with at least 5 weathered samples and 5 controls and then the results are calculated using standard statistical methods. The preferred standard ASTM test methods to measure tensile strengths for different types of materials are listed in Table 1 below.

TABLE 1

ASTM Test Methods used to measure change in Tensile Strength

| Method Number | Description of Applicable Materials |
|---|---|
| D 5034-90 | Textile fabrics |
| D 2256-90 | Single Strand Fibers |
| D 578-90 | Glass fibers (refers to D2256 Option 1A) |
| D 828-87 | Paper and paperboard |
| D 882-91 | Thin films and sheets |
| D 1876 | Flexible laminate constructions |

In the Soil Degradation Test Method B-2, the suspected degradable matrix material (fibers, film, or adhesive) is buried 3 cm deep in soil. The soil is composed of 50% by volume of top soil or leaf mold, 5% by volume of well rotted and shredded cow manure, and 45% by volume of coarse sand. The buried sample is wetted down and exposed to outdoor weather for 12 months in U.S. Hardiness Zone 7 (seven) developed by the Agricultural Research Service of the U.S. Department of Agriculture. The zones are based on the average annual minimum temperature for each zone. The average annual minimum temperature for Zone 7 is 0 to 10 degrees Fahrenheit. Delaware is a preferred testing location. If it does not rain during a seven day period, the buried sample is watered thoroughly on the seventh day. If the degradable matrix material has decomposed and disappeared or has decomposed and retains no integrity after this 12 month exposure, the matrix material is confirmed as being degradable in the Soil Degradation Test Method B-2. If after this outdoor exposure the degradable matrix material is still available for testing, it is carefully removed and rinsed and allowed to dry out for 7 days at 23° C. If the suspected degradable matrix material loses 70% or more of its initial strength, then it is considered to be degradable under the Soil Degradation Test Method B-2 in this specification. Fibers which under the same test protocol lose less than 70% of their initial strength are considered to be stable fibers under the Soil Degradation Test Method B-2 in this specification.

Suspected hydrolytically degradable matrix materials are often tested by the Hydrolysis Test H-1. In the Hydrolysis Test H-1, the suspected degradable matrix material is soaked in water for a defined period of time. An exposure period of 120 days at 23° C. is preferred and even more preferable is an exposure period of 180 days at 23° C. The degradable matrix material is then removed from the water and allowed to dry out at 23° C. for 7 days before testing the tensile strength. If the suspected degradable matrix material loses 70% or more of its initial strength, then it is considered to be degradable under the Hydrolysis Test H-1 in this specification. Fibers which under the same test protocol lose less than 70% of their initial strength are considered to be stable fibers under the Hydrolysis Test H-1 in this specification.

Sod reinforcements have particular preferred ranges of stable fibers and degradable matrix materials. These preferred ranges of stable fibers and degradable matrix materials deliver a good balance of ease of manufacture and handling of the virgin sod reinforcements. The preferred ranges of stable fibers and degradable matrix materials also form sod mats with good production and handling to characteristics. Sod reinforcements of this invention preferably have from about 1% to 99% stable fibers by weight and more preferably 2% to 98% stable fibers by weight and even more preferably from about 10% to 95% stable fibers by weight and most preferably from about 25% to 80% stable fibers by weight. Sod reinforcements of this invention preferably have from about 99% to 1% degradable matrix material by weight and more preferably from about 98% to 2% degradable matrix material by weight and even more preferably from about 90% to 5% degradable matrix material by weight and most preferably from about 75% to 20% degradable matrix material by weight.

Different sod reinforcement construction classes of this invention have more particular preferred ranges of stable fibers and degradable matrix materials. Some preferred classes follow. In sod reinforcements of this invention which are nonwoven fabrics comprised of stable fibers and degradable matrix materials wherein the degradable matrix material is comprised of degradable fibers, from about 10% to 95% stable fiber by weight is preferred and from about 25% to 80% stable fiber by weight is more preferred and from about 30% to 75% stable fiber by weight is even more preferred. In sod reinforcements of this invention which are nonwoven fabrics comprised of stable fibers and degradable matrix materials wherein the degradable matrix material is comprised of degradable fibers, from about 90% to 5% degradable matrix material by weight is preferred and from about 75% to 20% by weight degradable matrix material is more preferred and from about 70% to 25% by weight degradable matrix material is even more preferred. In preferred laminate constructions, the degradable matrix material is generally a higher percentage. In laminate constructions, sod reinforcements of this invention having from about 1% to 70% stable fibers by weight are preferred and from about 2% to 60% stable fibers by weight are more preferred and from about 3% to 50% stable fibers by weight are even more preferred. In laminate constructions, sod reinforcements of this invention having from about 99% to 30% degradable matrix material by weight are preferred and 98% to 40% degradable matrix material by weight are more preferred and from about 97% to 50% degradable matrix material by weight are even more preferred. In sod reinforcements of this invention employing a virtual stable fiber structure wherein the stable fibers are temporarily bonded at some or all their cross-over points, the stable fibers from about 60% to 99% by weight are preferred and stable fibers from about 80% to 98% by weight are more preferred and stable fibers from about 85% to 97% are most preferred. In sod reinforcements of this invention employing a virtual stable fiber structure wherein the stable fibers are temporarily bonded at some or all their cross-over points, the degradable matrix material of from about 40% to 1% by weight is preferred and degradable matrix material from about 20% to 2% by weight is more preferred and degradable matrix material from about 15% to 3% is most preferred.

Sod mats of this invention are very easy to handle and promote stable fiber entanglement with the plant roots. We have discovered in this instant invention that small diameter fibers (and weaker fibers) in the sod reinforcement facilitate the tearing of the fibers by the root penetration, minimize root breakage with hand subdivisions and also aid in easy dispersion of the sod reinforcement in the soil after use. Small diameter stable fibers also improve the handling the sod reinforcement before use and the feel of the final reinforced sod mats. Fiber diameter is measured in centimeters and is determined by optical microscopy or scanning electron microscopy. The determination of fiber diameter by these techniques is well known to those skilled in the art. Sod reinforcement comprised of stable fibers of less than or equal to about 0.02 cm in diameter are preferred and more preferably are stable fibers of less than or equal to about 0.006 cm in diameter and even more preferably are stable fibers of less than or equal to about 0.004 cm in diameter and most preferably are stable fibers of less than or equal to about 0.002 cm in diameter. Sod reinforcements comprised of stable fibers of greater than or equal to about 0.0002 cm in diameter are also preferred and more preferably are stable fibers of greater than or equal to about 0.0003 cm in diameter and even more preferably are stable fibers of greater than or equal to about 0.0005 cm in diameter. Stable fibers comprised of synthetic thermoplastic fibers are preferred to be from about 0.02 to 0.0002 cm in diameter and more preferably from about 0.006 to 0.0002 cm in diameter and even more preferably from about 0.004 to 0.0003 cm in diameter and most preferably from about 0.002 to 0.0005 cm in diameter Particular types of stable fibers have different preferred ranges of fiber diameters. Stable fibers comprised of inorganic fibers and particularly, glass fibers are preferably from 0.006 to 0.000002 cm in diameter and more preferably from 0.004 to 0.000003 cm in diameter and even more preferably from about 0.002 to 0.000005 cm in diameter.

Degradable fiber diameter affects the ease of manufacture and the handling characteristics of the sod reinforcements of this invention. Small degradable fiber diameter improves the handling sod reinforcement before and during installation and also improves the feel of the sod mat formed. Degradable fiber diameter also affects how rapidly the degradable fibers will decompose and thus, significantly affects garden friendliness. Usually, fine diameter degradable fibers degrade more rapidly and improve garden friendliness. Fine diameter degradable fibers also improve sod reinforcement handling. Degradable fibers with a diameter of less than 0.03 cm are preferred and degradable fibers with a diameter of less than or equal to about 0.01 cm are more preferred and degradable fibers with a diameter of less than or equal to 0.006 cm are even more preferred and degradable fibers with a diameter of less than or equal to about 0.004 cm are most preferred. Staple cotton fibers are generally about 0.0015 cm in diameter. Degradable fibers of greater than 0.0002 cm are preferred and degradable fibers greater than 0.0004 cm are more preferred. Sod reinforcements of this invention wherein the degradable fibers consist essentially of degradable fibers from about 0.03 to 0.0002 cm in diameter are preferred. Sod reinforcements of this invention wherein the degradable fibers consist essentially of degradable fibers from about 0.01 to 0.0002 cm in diameter are more preferred. Sod reinforcements of this invention wherein the degradable fibers consist essentially of degradable fibers from about 0.006 to 0.0002 cm in diameter are even more preferred. Sod reinforcements of this invention wherein the degradable fibers consist essentially of degradable fibers from about 0.004 to 0.0004 cm in diameter are most preferred.

As discussed above, it is preferable to have good early plant root penetration and entanglement with the sod reinforcements to facilitate propagation of sod mats with earlier harvest times and good handling characteristics. In some sod mats, such as Example 2 and 6 below this is very important. This root penetration and entanglement with stable fibers of the sod reinforcement creates mutual reinforcement of the sod reinforcement with the roots and visa versa. Root penetration is measured by the following process:

1). A representative section of sod mat is chosen for measurement—usually
   about 20 centimeters by 20 centimeters.

2). The roots penetrating through the bottom of the reinforcement are carefully shaved off with a sharp instrument such as a single edge razor and carefully added to a clean 2 liter beaker.

3). The shaved roots are then carefully washed with tap water by mixing and screening out the shaved roots and placing them in a separate clean 2 liter beaker.

4). Steps 2) and 3) are repeated four times (or until the roots are visually clean) to remove the dirt and nonroot foreign matter. The clean washed roots are then transferred to a pre-weighed lightweight aluminum weighing dish.

5). The washed roots in the pre-weighed dish are then dried for 8 hours at 110 degrees centigrade in a ventilated, temperature controlled oven.

6). The root penetration is then calculated as follows (20 cm by 20 cm sod mat):

| | |
|---|---|
| Gross weight (dried roots plus dish) | 5.55 g |
| Tare weight of aluminum dish | 5.42 g |
| | 0.13 g per 400 cm² of sod mat |

An added benefit of these sod mats unrealized in the art is when the sod mats have served their useful purpose and are then rototilled or otherwise dispersed in the soil, the sod mat's sod reinforcement has partially decomposed and thus are often easy to tear because of their generally lower strength, whereupon the root reinforcement rots and thus, further facilitates easy dispersion of the spent sod reinforcement in the soil. By numerous experiments, we have determined that a root penetration of greater than or equal to about 0.05 grams per 400 square centimeters of sod mat are preferred and more preferable are root penetrations of greater than or equal to about 0.1 grams per square centimeters of sod mat and even more preferable are root penetrations of 0.2 grams per 400 square centimeters of sod mat. To promote early harvest, sod mats with root penetration of less than or equal to about 10 grams per 400 square centimeters of sod mat are preferred and more preferable are sod mats with less than or equal to about 7 grams per 400 square centimeters of sod mat.

Sod reinforcements are not generally limited to particular types of degradable matrix materials and particular types of stable fibers. Representative examples of stable fibers include stable synthetic thermoplastic fibers and inorganic fibers such as glass fibers. The fibers can be continuous or discrete lengths or mixtures thereof. Nonwoven fabrics comprised of mixtures of stable synthetic thermoplastic fibers and biodegradable fibers such as cellulose or rayon are representative examples. Representative stable fibers made from synthetic thermoplastic resins are polyester fibers, nylon fibers, and polyolefin fibers. Nonwoven webs are broadly defined as web structures made by mechanically, thermally or chemically bonding or entangling thermoplastic and/or other fibers such as cellulosic fibers. The amount of fiber bonding and/or fiber entanglement can effectively be varied over a broad range. When practiced according to the guidance of this instant invention by those of ordinary skill in the art, many common types of nonwoven fabrics and nonwoven webs can be utilized effectively. Preferred nonwoven fabrics comprise melt blown nonwoven fabrics, hydroentangled nonwoven fabrics, spunbond nonwoven fabrics, wet laid nonwoven fabrics, and carded nonwoven fabrics. The dry carded process generally uses cut staple fiber bonded together using usual art-known bonding techniques such as adhesive binders, heated calendar rolls, hot air, sonic, laser, pressure bonding needle punch and the like. Chemically bonded nonwoven fabrics generally use latex binders. The staple length fibers offer many advantages to these types of sod reinforcements such as sod mat versatility and good propagation characteristics. Hydroentangled, wet laid nonwovens, and melt blown nonwoven fabrics are especially preferred types of sod reinforcements.

Although the nonwoven fabric and nonwoven web examples below are carried out with stable fibers of polyester and polypropylene and degradable fibers of rayon and cellulose, it will be understood that the invention is not limited thereto and that other stable fibers and degradable fibers capable of effectively making nonwoven webs and nonwoven fabrics are to be included. The chemistry of stable fibers of synthetic resins in sod reinforcement preferably comprises polyolefin or nylon chemistries. Polyolefins such as polyethylene and polypropylene are particularly preferred because of their low cost, degradability, and broad availability. Linear low density polyethylene is a particularly preferred polyethylene. Other preferred polyethylenes are copolymers of polyethylene and higher alpha-olefins having 4 to 18 carbon atoms. Nylons such as nylon 6 or nylon 66 are particularly preferred for excellent water infiltration, root wetting, degradability, and general versatility. Other particularly useful stable fiber chemistries comprise polyesters, acrylics, and polyurethanes. A preferable stable polyester is polyethylene terephthalate. Preferred biodegradable fibers are cotton, rayon, wood, and other cellulose based fibers. Very low strength nonwoven fabrics can be effectively reinforced with these degradable fibers, such as cotton, rayon, or other cellulosic fibers during manufacture. The degradable fibers can be hydroentangled with a spunbond nonwoven fabric to reinforce a light Weight spunbond fabric. A hydroentangled nonwoven web can be formed with a mixture of stable fibers and degradable fibers. In yet another example, the stable fibers and degradable fibers are formed into a melt blown nonwoven fabric. Nonwoven fabrics can also be manufactured with degradable adhesives. The technology to produce nonwoven fabrics containing both stable and degradable matrix material is well known and well documented in the open art. Representative examples of nonwoven processes well known in the art include U.S. Patents U.S. Pat. No. 5,151,320 to Homonoff et al., U.S. Pat. No. 5,151,320 to Flint, U.S. Pat. No. 5,106,457 to Manning, U.S. Pat. No. 5,098,764 to Drelich, U.S. Pat. No. 4,970,104 to Radwanski, U.S. Pat. No. 4,931,355 to Radwanski, U.S. Pat. No. 4,857,065 to Seal, U.S. Pat. No. 4,808,467 to Suskind, U.S. Pat. No. 4,755,178 to Insley, U.S. Pat. No. 4,623,576 to Lloyd et al., U.S. Pat. No. 4,451,315 to Miyazaki, U.S. Pat. No. 4,100,324 to Anderson and U.S. Pat. No. 3,554,788 to Fechillas and are included herein by reference. These references are not meant to limit nonwoven fabrics useful in this invention, but only to serve as helpful examples to those skilled in the art. Stable fiber reinforced paper technology is well known to those skilled in the art. Nonwoven fabrics including stable fiber reinforced paper products useful in this invention are available from companies such as Kimberly-Clark in Neenah, WI, Fiberweb North America, Inc. in Greenville, SC, and Johnson & Johnson Advanced Materials Co. in New Brunswick, NJ.

Figure 4:
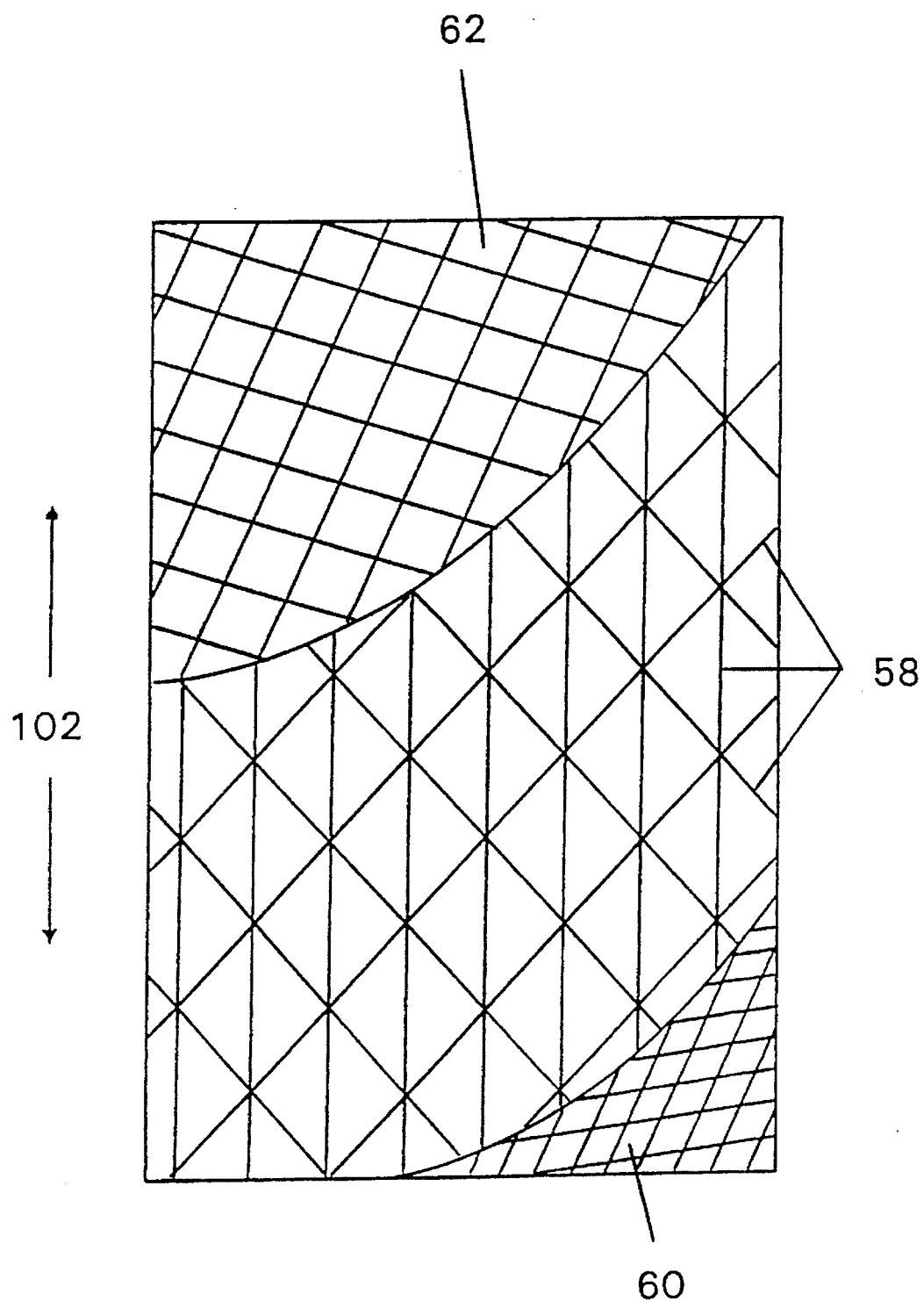
FIG. 4 is an simplified perspective view of a sod reinforcement using a repeating pattern of glass fiber reinforcement laminated between paper.

We have discovered that sod reinforcements can be used to produce sod mats of this invention wherein the sod reinforcement comprises a plurality of stable fibers supported on or laminated between or reinforced with a degradable matrix material. An example of a preferred sod reinforcement has a stratum of degradable matrix material and a stratum of stable fibers. A more preferred sod reinforcement has an upper stratum of degradable matrix material and middle stratum of stable fibers and a lower stratum of degradable matrix material. FIG. 4 is an artist's conception of sod reinforcement which is comprised of a plurality of stable fibers laminated between two sheets of paper or cellulosic fibers. Reference Numeral 58 represents the stable fiber or stable fiber bundles in the sod reinforcement. Reference Numeral 60 represents the lower layer of degradable matrix material supporting and keeping the sod reinforcement fibers aligned. Reference Numeral 62 represents the optional upper layer of the degradable matrix material which adds a degree of protection for the reinforcement fibers for shipping and handling of the sod reinforcement. Representative degradable matrix materials are cellulose based such as paper or are degradable synthetic thermoplastic films. Representative degradable synthetic thermoplastic films which are commercially available include hydrolytically sensitive polyvinyl alcohol films and biodegradable starch based films. Examples include VINEX® and NOVON® synthetic resins. Representative manufacturers include but are not limited to such companies as Warner Lambert Company in Morris Plains, NJ, Air Products & Chemicals in Allentown, PA, and Mitsui Plastics in White Plains, New York. The sod reinforcement fibers are often arranged in a uniform and repeating pattern as shown in this FIG. 4. When laminating stable fiber bundles such as thread, roving, or yarns and the like between or to a degradable matrix material, normally repeating and uniform patterns are preferred. Preferred patterns are parallel stable fiber bundles running in one direction, parallel fiber bundles running in two directions forming diamond, trapezoid, and rectangular patterns, or numerous combinations of both of these patterns which may form triangles or other repeating patterns in the stable fiber bundles. FIG. 4 illustrates some typical repeating patterns formed by the stable fibers. Parallel stable fiber bundles which are within 4 cm of their nearest parallel stable fiber bundle neighbor are preferred and stable fiber bundles which are within 3 cm of their nearest parallel stable fiber bundle neighbor are more preferred and stable fiber bundles which are within 2 cm of their nearest parallel stable fiber bundle neighbor are even more preferred. The parallel stable fiber bundles which are greater than 0.2 cm from their nearest parallel stable fiber bundle neighbor are preferred and stable fiber bundles which are greater than 0.3 cm from their nearest parallel stable fiber bundle neighbor are more preferred. It is to be understood that the stable fiber bundles such as threads, roving, and/or yarns can include some degradable matrix materials such as cotton fibers therein. Stable fiber monofilaments are very effective. Stable fiber bundles are preferred comprising from about 3 to 500 stable fibers each and more preferably from about 5 to 150 stable fibers in each and even more preferably from about 5 to 100 stable fibers in each. Preferred stable fiber bundles are yarns, threads and roving.

Lamination facilitates easy handling of the sod reinforcement. The upper and lower sheets are bonded using technology known in the art. A representative example is using degradable glues or adhesives. Representative glue degradation mechanisms are hydrolytic degradation and biodegradation. Commercial adhesives are available from such companies as National Starch, National Casein, and Air Products. A representative commercial adhesive is AIR-FLEX® 911 available from Air Products. Other representative commercial adhesives include casein, animal, dextrin, and starch based glues. Other adhesives or glues which are easily dispersed in the soil after the laminate degrades are also very effective. The technology for laminating reinforcement strands of fiber glass or synthetic nylon fibers between the layers of paper are well known in the art. Uniform and repeating stable fiber patterns or random stable fiber reinforcement of the laminate can be used. A representative reference is U.S. Patent U.S. Pat. No. 5,156,910 issued to Raszewski. Laminated Kraft paper with stable fiber reinforcement can make an effective sod reinforcement. Reinforced Kraft paper with glass fibers is an effective sod reinforcement especially when care is used in selecting degradable adhesives and water permeable constructions. Stable fibers such as nylon fibers substantially encapsulated in cellulosic fibers using known paper making technology an effective sod reinforcement of this invention. Illustrative examples of useful stable fiber reinforced paper technology is found in the book Synthetic Fibers in Paper Making by O. A. Battista published by John Wiley & Sons, Inc, 1964. These examples and references are not meant to limit paper technology useful in this invention, but only to serve as additional helpful guidance for those of ordinary skill in the art. As stated above, when the sod mats have served their useful purpose and are then rototilled or otherwise dispersed in the soil, the sod mats generally tear easily because they are partially decomposed, whereupon the root reinforcement and any remaining degradable matrix material rots and thus, further facilitates dispersion of the sod reinforcement in the soil. Mutual reinforcement of these sod mats is preferable because they are fairly heavy. Actual sod mat weight per unit area depends on a number of factors such as planting medium thickness, planting medium density, moisture level and the like well known to those skilled in the art. See for instance U.S. Pat. No. 5,224,290 issued to Molnar et al. Preferred sod mats of this invention have a weight per unit area of greater than 4 kg per square meter (kgpsm) and sod mats having a weight per unit area of greater than 6 kgpsm are more preferred and sod mats having a weight per unit area of greater than about 8 kgpsm are even more preferred and sod mats having a weight per unit area of greater than about 12 kgpsm are most preferred. Preferred sod mats of this invention have a weight per unit of less than 60 kgpsm and sod mats having a weight per unit area of less than 50 kgpsm are more preferred and sod mats having a weight per unit area of less than 40 kgpsm are even more preferred. The mutual reinforcement of the roots with the sod reinforcement can be calculated using the measurement techniques disclosed in some of the attached examples along with the equation below. The mutual Reinforcement Ratio (MRR) of the sod reinforcement can be calculated by dividing the weight of a useful sod mat with planting medium and root penetration and entanglement by the weight that the weathered sod reinforcement will not support and which causes tearing (with no root reinforcement). Using Example 4 contained herein, the Mutual Reinforcement Ratio of the sod reinforcement is calculated in the following manner:

$$\text{Mutual Reinforcement Ratio} = \frac{2753 \text{ grams } (SGW)}{1200 \text{ grams } (TW \text{ of } NSR)}$$

$$\text{Mutual Reinforcement Ratio} = 2.4$$

where:

SGW=Sod Gross Weight in grams which can be lifted in grams.

TW of NSR=Tearing Weight of Sod reinforcement in grams.

The Mutual Reinforcement Ratio is preferably run in triplicate for sods of similar characteristics. Similar sod mat characteristics include similar root penetration (plus or minus approximately 20%), the same sod reinforcements, same plants, and planting rates. Similar propagation conditions are also used such as propagation times, moisture level and planting mediums. The determination of the Mutual Reinforcement Ratio may require some ordinary experimentation. For example, some experimentation may be necessary to determine a reasonable sod mat weight to propagate for the particular sod reinforcement used under the similar conditions discussed above. Using the disclosures herein, one of ordinary skill in the art and using ordinary experimentation can determine the Mutual Reinforcement Ratio for sod mats grown with sod reinforcements. Plant sod mats which are effectively reinforced with the entanglement of the plant roots and the sod reinforcement are preferred. Plant sod mats which are substantially reinforced with the entanglement of the plant roots with both roots which penetrate the sod reinforcement and the sod reinforcement itself are more preferred. Sod mats wherein the plant roots penetrate the sod reinforcement and entangle with each other below the sod reinforcement are particularly preferred. Mutual Reinforcement Ratios of greater than about 1.5 are preferable and Mutual Reinforcement Ratios of greater than or equal to about 2 are especially preferred. Further details are included in Example 2 and 4.

An object of this invention is to promote ease of hand subdivision and ease of handling of the sod mats. Many factors affect this such as stable fiber diameter discussed above, extent of stable fiber bonding or entanglement, stable fiber percentage, and stable fiber length. As the stable fibers become longer the reinforcement potential of the sod reinforcement generally increases and as the stable fiber length decreases, the ease of hand subdivision generally becomes easier. Thus both long and short discrete stable fibers are useful. For webs comprising stable fibers with discrete lengths, the stable fibers are preferably shorter than about 60 cm and more preferably shorter than about 20 cm and even more preferably shorter than about 10 cm and most preferably shorter than about 6 cm. The stable fibers are preferably longer than about 0.2 cm and more preferably longer than about 0.3 cm and even more preferably longer than about 0.5 cm and most preferably longer than about 1 cm.

As discussed earlier, sod mats of this invention can be designed to be easily dispersed in the garden soil when their useful life is past. As the amount of stable fiber decreases, the sod mats become easier to disperse. Stable fiber web strength is also important and is affected by a number factors such as chemistry, stable fiber web structure, and stable fiber web basis weight and degree of bonding or entanglement of the stable fibers. These factors are well known to those skilled in the art. The weight percent of the sod reinforcement in the sod mat affects the amount of the stable fiber which must be dispersed or mixed into the soil and thus can also affect disposal. The weight percent of the dry sod reinforcement is preferably less than 4% by weight of the gross weight of the sod mat and more preferably less than 0.5% by weight of the gross weight of the sod mat and even more preferably less than 0.3% by weight of the gross weight of the sod mat and most preferably less than 0.1% by weight of the gross weight of the sod mat. The weight percent of the sod reinforcement is preferably greater than 0.01% by weight and even more preferably greater than 0.03% by weight of the gross sod mat. As an example calculation, if the dry sod reinforcement is 30 gpsm and the sod mat weighs 30000 gpsm, then the weight percentage of the dry sod reinforcement is 0.1% of the gross weight of the sod mat. In order to keep the amount of stable fibers in the sod mat low, stable fibers per unit area of the reinforcement is preferably low and will be referred to in this specification as the stable fiber basis weight. The stable fiber basis weight is measured in ounces per square yard (opsy) or grams per square meter (gpsm). A stable fiber basis weight of less than or equal to about 70 gpsm is preferred and a stable fiber basis weight of less than or equal to about 40 gpsm is more preferred and a stable fiber basis weight of less than or equal to about 20 gpsm is even more preferred and a stable fiber basis weight of less than or equal to about 10 gpsm is most preferred. A stable fiber basis weight of greater than or equal to about 0.3 gpsm is preferred and even more preferable is a stable fiber basis weight of greater than or equal to about 1.5 gpsm and even more preferred is a stable fiber weight of greater than or equal to about 3 gpsm.

As the stable fiber basis weight and strength decrease in the sod reinforcement, the plant root entanglement with stable fibers of the sod reinforcement, of course, become increasingly important in reinforcing the sod mat. This makes sod reinforcements with heretofore unheard of low stable fiber basis weights useful in producing sod mats. Examples of sod mats with strengths much higher than the sod reinforcement could be expected to support and much higher than the equivalent plant roots without reinforcement could support are demonstrated below. We believe this is because viable plant sod mats of this invention are reinforced by both the stable fibers of the sod reinforcement and the plant roots. Beneficial temporary reinforcement of the sod mats of this invention can also accrue from plant root penetration and entanglement with degradable matrix materials. Thus, one skilled in the art will recognize that not only does one benefit from reduced propagation times and improved handling, but the grower also benefits by using lower stable fiber basis weights than heretofore used for garden sod mats. Thus even though the sod mats of this invention are substantially heavier on a per unit area of viable plant sod mat because they contain a moist, relatively heavy planting medium layer than comparable light weight seed mats (which contain no moist, heavy planting medium layer), these sod mats often use lower stable fiber basis weights and strength sod reinforcements and yet retain good handling characteristics because of the additional plant root reinforcement.

Thus using this instant invention, sod mats of grasses, nutritional plants and ornamental plants are easily and cost effectively propagated. The resulting sod mats have excellent shelf life stability, are easy to hand subdivide, and have improved "shelf life" stability. The potential for girdling of plant roots is significantly reduced in many sod mats of this invention. In addition, these sod mats place reduced demands on the strength of the stable fibers in the sod reinforcement and thus often allow reduced consumption of stable fibers in these reinforcements. Sod reinforcements based on polyolefin fibers and glass fibers are particularly preferred for their low cost and versatility. Sod reinforcements based on nylon fibers are particularly preferred for their natural hydrophilic properties, in applications where apertures are not feasible for some reason, and for their good versatility.

Figure 5:
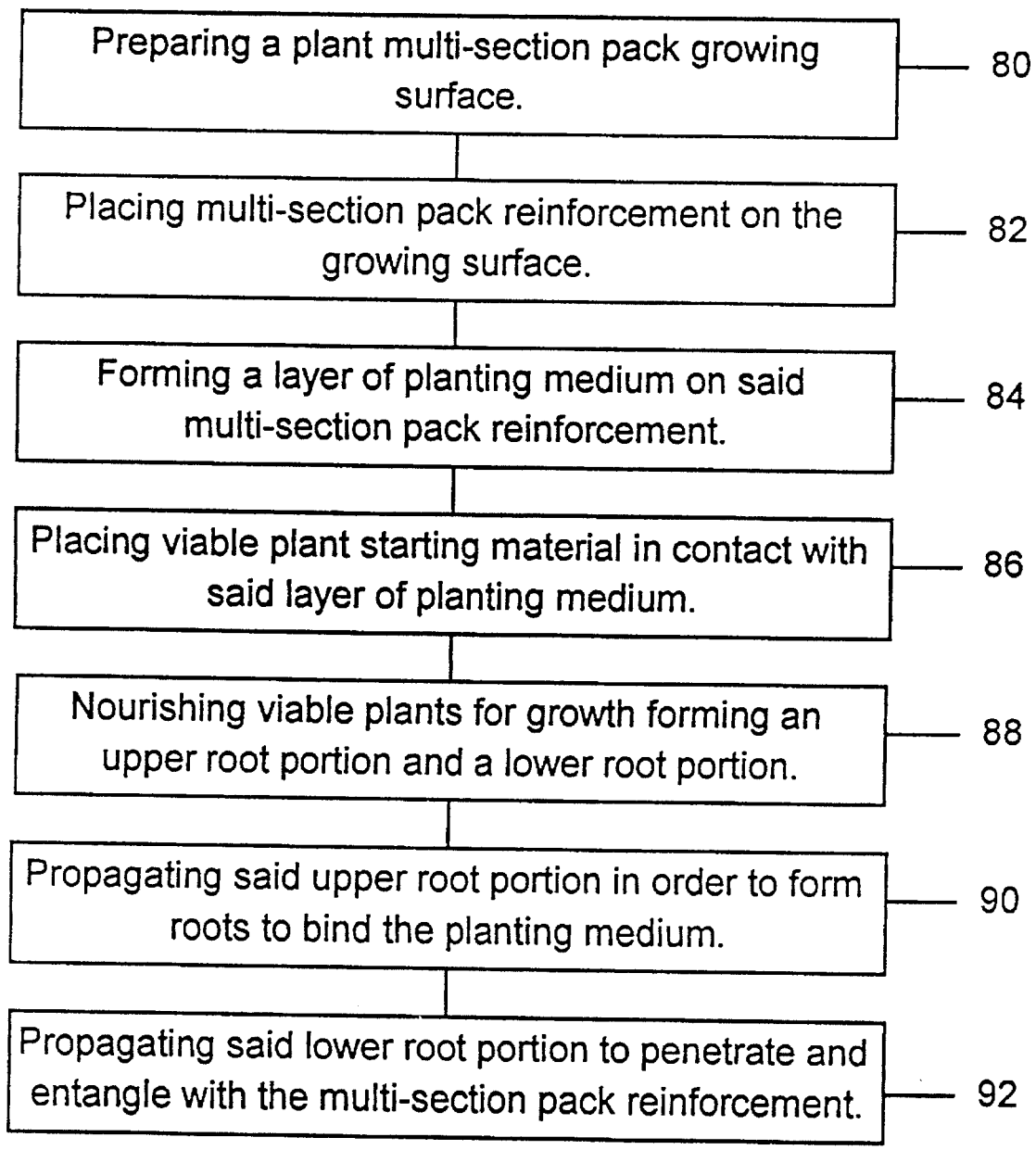
FIG. 5 is a block diagram illustrating a typical container process of the invention.
Figure 6:
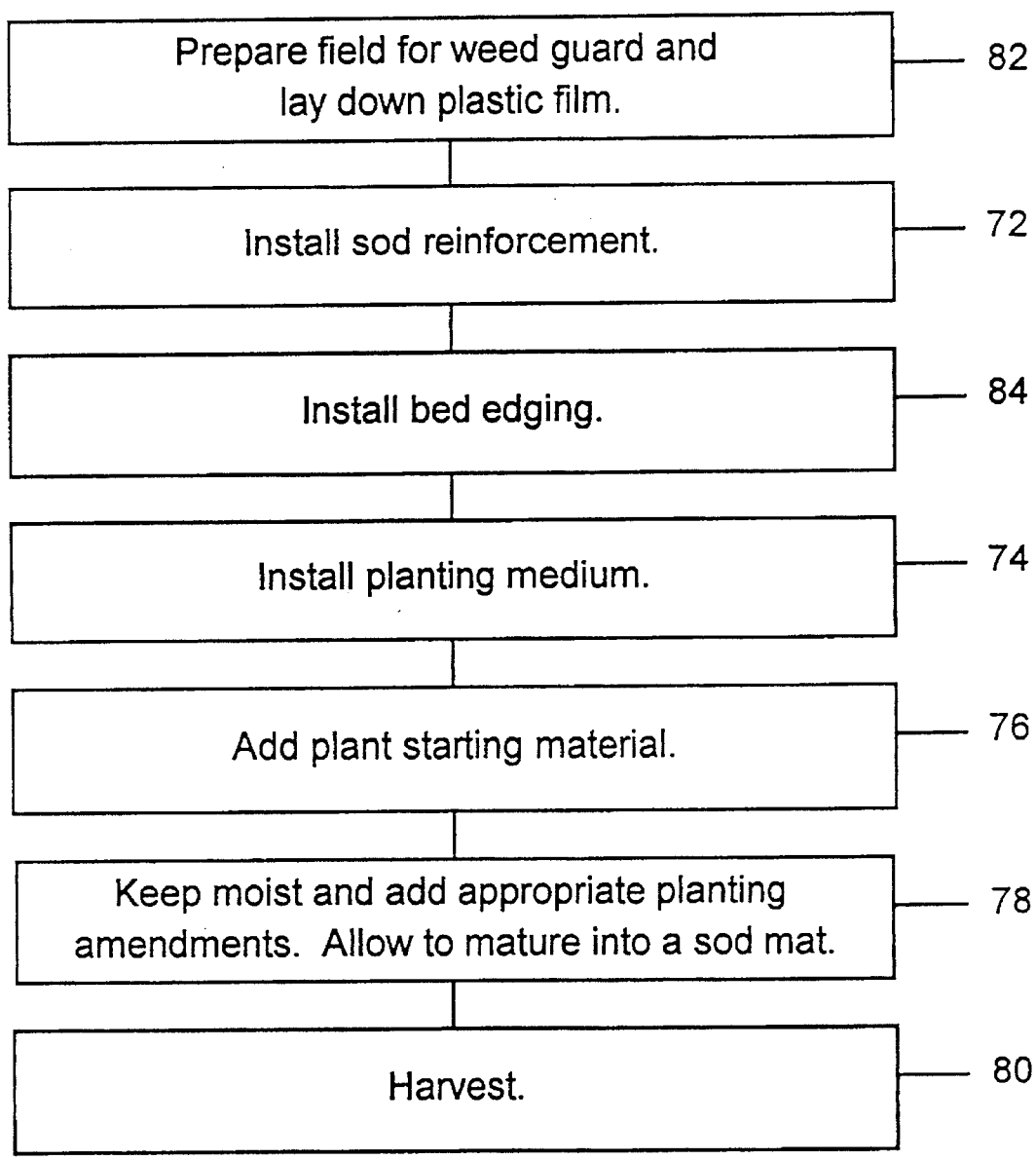
FIG. 6 is a block diagram of it typical field process of the invention.

Process Description (FIGS. 5 and 6)

In FIG. 5, there is shown a block diagram illustrating the general process for growing small sod mats according to this invention. The six generalized steps are: (1) the step 70 of selecting the appropriate flat or container for growing the sod mats of this invention. The flat is usually from 5–10 cm deep, about 20–40 cm wide and about 20-70 cm long. Size is selected based on normal considerations of one of ordinary skill in the art such as preferred size by end-use customer, optimum depth of the planting medium for the target plant species, availability, and cost. A flat with drain holes is normally preferred. The bottom of the flat usually serves as Reference Numeral 40-the sod mat growing surface. A perforated polyethylene film is helpful for some types of flats. Step (2) the step 72 consists of installing the sod reinforcement (Reference Numeral 42) on the bottom of the flat (Reference Numeral 40). (3) step 74 consists of selecting and installing the planting medium (Reference Numeral 44) to the optimum depth for the target plant species. Planting medium amendments can be added such as hay, vermiculite and the like as desired at this step. Drenching can also be useful at times. (4) step 76 consists of adding the plant species starting material (Reference Numeral 48) to the planting medium. (5) step 78 consists of normal feeding and care of the sod mat plant species such as watering, drenching, fertilizing, proper level of sunshine or shade, soil amendments, and the like during propagation. (6) step 80 consists of harvesting the sod. One can sell the sod with the flat or remove the sod mat and sell it without the flat.

FIG. 6 is a block diagram illustrating the general process of growing sod mats in the field according to this invention. The seven general steps are: (1) step 82 consists of preparing the field beds by tilling the soil, removing any major weeds left, and then grade and smooth out. Lay down a plastic weed guard such as 6 mil black polyethylene film (Reference Numeral 40). Rows 4–8 feet wide by 100–200 feet are generally used. Aisles generally 3 feet wide are left between the rows for easy access. Common geotextiles are used between the rows to reduce weeds. Herbicides may also be used as desired to reduce weeds. (2) in step 72 the sod reinforcement (Reference Numeral 42) is laid down on top of the black polyethylene film (Reference Numeral 40). (3) step 84 consists of installing appropriate bed railing such as 4" by 4" rot resistant treated lumber on the edges of the beds to contain the planting medium (Reference Numeral 44). Optionally, 1" by 2" rot resistant lumber may also be used to further subdivide the bed into smaller individual plots. (4) step 74 consists of selecting the preferred planting depth for the selected plants and adding the planting medium. Preferred planting medium amendments may also be added here. Drenching can also be useful at times. (5) step 76 consists of adding the target plant starting materials to the planting medium. (6) step 78 consists of normal feeding and care of the plants including such items as watering, drenching, appropriate light level control, planting medium amendments, and the like. If desired for environmental control reasons, common crop covers may be used to help warm the planting medium in the spring or for some protection from marauding birds. Hay or crop covers may be used to help to over winter the sod mats. Allow sod to mature for 1–18 months. (7) step 80 consists of harvesting the sod mats. The sod mats are generally harvested in sizes from 20–80 cm wide to about 20–100 cm long.

Step 78, the step of normal feeding and care of the sod mat plant species to develop a sod mat wherein the plant roots penetrate and entangle the sod reinforcement effectively reinforcing said sod mat are preferred. The sod mat growing surface (Reference Numeral 40) encourages lateral growth and entanglement of the plant roots (Reference Numeral 56) which penetrate the sod reinforcement to create this effective reinforcement. Normal feeding and care of the sod mat plant species to develop a sod mat wherein the plant roots penetrate and entangle the sod reinforcement substantially reinforcing said sod mat are more preferred. Normal feeding and care of the sod mat plant species to develop a Mutual Reinforcement Ratio of 1.5 is even more preferred. Normal feeding and care of the sod mat plant species to develop a Mutual Reinforcement Ratio of 2 is most preferred.

The step 78 of normal feeding and care of the sod mat plant species preferably decays a portion of the degradable matrix material. If the degradable matrix material has decayed and disappeared or has decayed and retains no integrity at harvest time, the matrix material is certainly confirmed as being decayed within the meaning of this specification. If after propagation and harvest the degradable matrix material is still available for testing, it is carefully removed from the sod mat with for instance a razor knife and rinsed and allowed to dry out for 7 days at 23° C. The tensile strength of the exposed degradable matrix material is compared with the same virgin degradable matrix material by the standard ASTM test methods discussed herein above. The degradable matrix material is considered decayed within the meaning of this specification if the suspected degradable matrix material loses 70% or more of its initial strength at harvest time. A preferred propagation process decays greater than about 15% of the sod reinforcement degradable matrix material and a more preferred propagation process decays greater than about 25% of the degradable matrix material and an even more preferred propagation process decays greater than about 50% of the degradable matrix material and a most preferred propagation process decays greater than about 80% of the degradable matrix material. Sod mats wherein the propagation process decays 100% of the sod reinforcement degradable matrix material are very useful because the plant roots entangle with the stable fibers to strengthen and form the sod mat. An example calculation is if a sod reinforcement has a sod reinforcement basis weight of 100 gpsm and degradable matrix material content of 80 gpsm before propagation and this same sod reinforcement after propagation and harvest weighs 60 gpsm, then the decayed degradable matrix material is 50% (or more, pending tensile strength test results). Decayed degradable matrix material improves root penetration, improves water infiltration, and improves garden friendliness.

Especially preferred propagation methods combine the advantage of substantially reinforced sod mats by the plant root penetration and entanglement with the sod reinforcement and the advantage of degradable matrix material that is decayed at harvest time. While some of the preferred embodiments of the instant invention have been discussed, it is understood that the invention is not limited to these, but is susceptible of numerous changes and modifications as are known to those of ordinary skill in the art using ordinary experimentation. One of ordinary skill in the art can use the embodiments of this instant invention with ordinary experimentation to develop preferred sod mats with sod reinforcements of this invention. It is also to be understood that the mutual reinforcement of the plant roots which penetrate the sod reinforcement and entangle with themselves and the sod reinforcement often plays an important roll in the good sod mat production, handling, and disposal characteristics. Those artisans skilled in the art know that the root development of *Cosmos bipinnatus* is greater than that of *Coreopsis tinctoria* which is greater than sweet woodruff. Two or more layered sod reinforcements of this invention can be used to reinforce new custom plant sod mats. Using the teachings of this specification, good sod mats of each of these plants can easily be grown. Those skilled in the art also know that some degradable matrix materials, such as unbleached cotton, are more susceptible to biodegradation than others, such as heavy paper. Further more some planting mediums appear to have a higher propensity to speed biodegradation than other planting mediums. A representative example is that FAIRGROW® generally speeds biodegradation along faster than TERRA-LITE REDI-EARTH® under equivalent conditions. Using the guidance and teachings of this specification along with ordinary experimentation, those of ordinary skill in the art can develop and grow sod mats with good production characteristics, that are easy to handle, that have good "shelf life" stability, and which place reduced demands on the stable fibers of the sod reinforcements. Custom sod mats can be grown which the balance with the landscapers' or customers' specific needs such as plant species, garden friendliness, propagation timing, and handling characteristics desired. The sod reinforcements are also easy to manufacture and handle.

EXAMPLES

The following examples will further aid and help to guide those of ordinary skill in the art to practice the invention. It is understood that the invention is not limited thereto, but is susceptible of numerous changes and modifications by those of ordinary skill in the art.

Example 1

A custom Flower Mix A1 was prepared with the following species: A mixture of wildflower seeds was made of *Achillea millefolium* (3%), *Cheiranthus allioni* (5%), *Chrysanthemum leucanthum* (5%), *Coreopsis lanceoleta* (9%), *Echinacea purpurea* (22%), *Hesperis matronalis* (7%), *Linum perenne lewisii* (7%), *Lychnis chalcedonica* (2%), *Rudbeckia hirta* (9%), *Centaurea cyanus* (4%), *Coreopsis tinctoria* (2%), *Gaillardia pulchella* (9%), *Linum grandiflorum* (14%), *Papaver rhoeas* (1%) and *Silene armeria* (1%) was made. Seed percentages are by weight.

Using the sod mat propagation technique illustrated in FIG. 6, a field grown sod mat is propagated using FAIRGROW® and using Johnson & Johnson Advanced Materials Co. MASSLINN® 5167 hydroentangled nonwoven fabric which is a blend of 50/50 rayon/polyester by weight and the nonwoven fabric has a basis weight of 20 gpsm. The stable fiber basis weight is thus 10 gpsm. The stable fibers are 50% by weight of this sod reinforcement. The machine direction grab tensile strength is nominally 9.5 lb and the transverse direction grab tensile strength is nominally 1.2 lb in unused state. Flower Mix A1 is used at a seeding rate of about 1–2 lbs per 1000 square feet. The sod is nurtured for about 8 months. A useful sod mat is harvested. The sod mat has good root penetration and good handling characteristics. Propagation conditions and time to harvest affects root penetration and entanglement and thus sod mat strength.

This sod mat is then planted and allowed to grow. After 180 days, we find that the sod mat reinforcement is dispersed in the soil by rototilling or other common means. Still furthermore, after rototilling we find that the roots rotted, thus reversibly destroying the root reinforcement, leaving the remnants of the sod mat reinforcement more dispersible in the soil.

A test nonwoven fabric comprised of 100% rayon fibers was tested by the Soil Degradation Test B-2 and was found to be degraded in 12 months. The test nonwoven fabric basis weight was 20 gpsm.

Example 2

Using the sod mat propagation technique illustrated in FIG. 6, a field grown sod mat is grown using municipal solid waste (MSW) and using a laminate of newspaper and glass fiber bundles for the sod reinforcement. The glass fibers are 0.0025 cm in diameter and a cross-section of the glass fiber bundle or roving is estimated as containing more than about 70 individual fibers. This sod reinforcement is similar to that illustrated in FIG. 6 and is an example of virtual stable fiber structure. The stable fiber bundles are laid out in a diamond pattern wherein the diamond pattern fiber bundles are about 1 cm from their nearest neighbor. Over the top of this diamond pattern is stable fiber bundles parallel to each other running the length of the sod reinforcement and spaced at about 0.65 cm from their nearest neighbor. The top layer of newspaper is Reference Numeral 62. The stable fiber bundles are about 20% by weight of this laminate sod reinforcement. The stable fiber basis weight is about 20 gpsm. The bottom layer of newspaper is Reference Numeral 60. AIRFLEX® 911 is used as a degradable adhesive. To this prepared field is added about 2 grams per square foot of Jonathan Green's Northeast Wildflower Mixture 12383 which contains bachelor's buttons, baby's breadth, wallflower, blue flax, ox-eye daisy, lance-leaved coreopsis, California poppy, evening primrose, catchfly, black-eyed Susan, prairie coneflower, plains coreopsis, and Missouri primrose. Jonathan Green is located in Farmingdale, NJ. The sod is watered and nurtured. The sod is harvested after about 4 months. The wet sod mat is easily lifted with two hands. The wet sod mat weighs 2.2 kg. The remnants of the newspaper are very weak. The stable fibers, in this case glass fibers, since they are not formed into any type of bonded or knitted netting structure, will not support any weight. In this sod mat the plant roots entangle with stable fibers and degradable matrix materials to form a surprising mutually reinforced sod structure and useful sod mat with good shelf-life.

Upon soaking an unused piece of this sod reinforcement in water for 24 hours, the adhesive dissolves and there is no bonding of the of the fiber glass bundles to each other or to the newspaper.

Example 3

Using the sod mat propagation technique illustrated in FIG. 5, a flat is prepared containing FAIRGROW® and using a laminate of Ergon ENPP 0105 melt blown polypropylene and newspaper as the stable fiber sod reinforcement. ENPP 0105 has a basis weight of 4 gpsm and a CD grab tensile strength of 1 lb and a MD grab tensile strength of 0.8 lb. ENPP 0105 is very delicate. The stable fiber basis weight is thus 4 gpsm. It is available commercially from Ergon Nonwovens in Jackson, Mississippi. The laminate is formed using AIRFLEX® 911 as a water soluble binder to adhere the ENPP 0105 to the newspaper. By laminating the ENPP 0105 between the newspaper the sod reinforcement is easier to handle. We currently believe this is due to both reduction of the static electricity and reinforcement from the paper. The stable fibers are about 4% weight of this sod reinforcement. Approximately 0.2 gins of plains coreopsis seeds are added to the flat. The sod is nurtured for about 3 months. The sod is harvested. This sod mat is easily lifted and is a useful sod mat. This sod mat has good root penetration (0.15 grams per 400 $cm^2$ of sod mat). The very low stable fiber basis weight aids root penetration. The laminate decomposes due to hydrolytic action on the AIRFLEX® 911 and subsequent biodegradation of the cellulose in the newspaper. This demonstrates the importance of good root penetration through the sod reinforcement and entanglement with the stable fibers, in this case the polypropylene fibers of the ENPP 0105, for good sod mat handling characteristics. Propagation conditions and time to harvest affect root penetration and entanglement and thus sod mat strength.

This sod mat is then planted and is nurtured. After 90 days, we find that the sod mat reinforcement is easily dispersed in the soil by rototilling or other common means. Still furthermore, after rototilling we find that the roots rotted, thus reversibly destroying the root reinforcement, leaving the remnants of the sod mat reinforcement more dispersible in the soil. Of coarse, the cellulosic fibers of newspaper is biodegraded. The very low stable fiber basis weight aids the dispersal of this spent sod reinforcement into the garden soil.

Example 4

Figure 7:
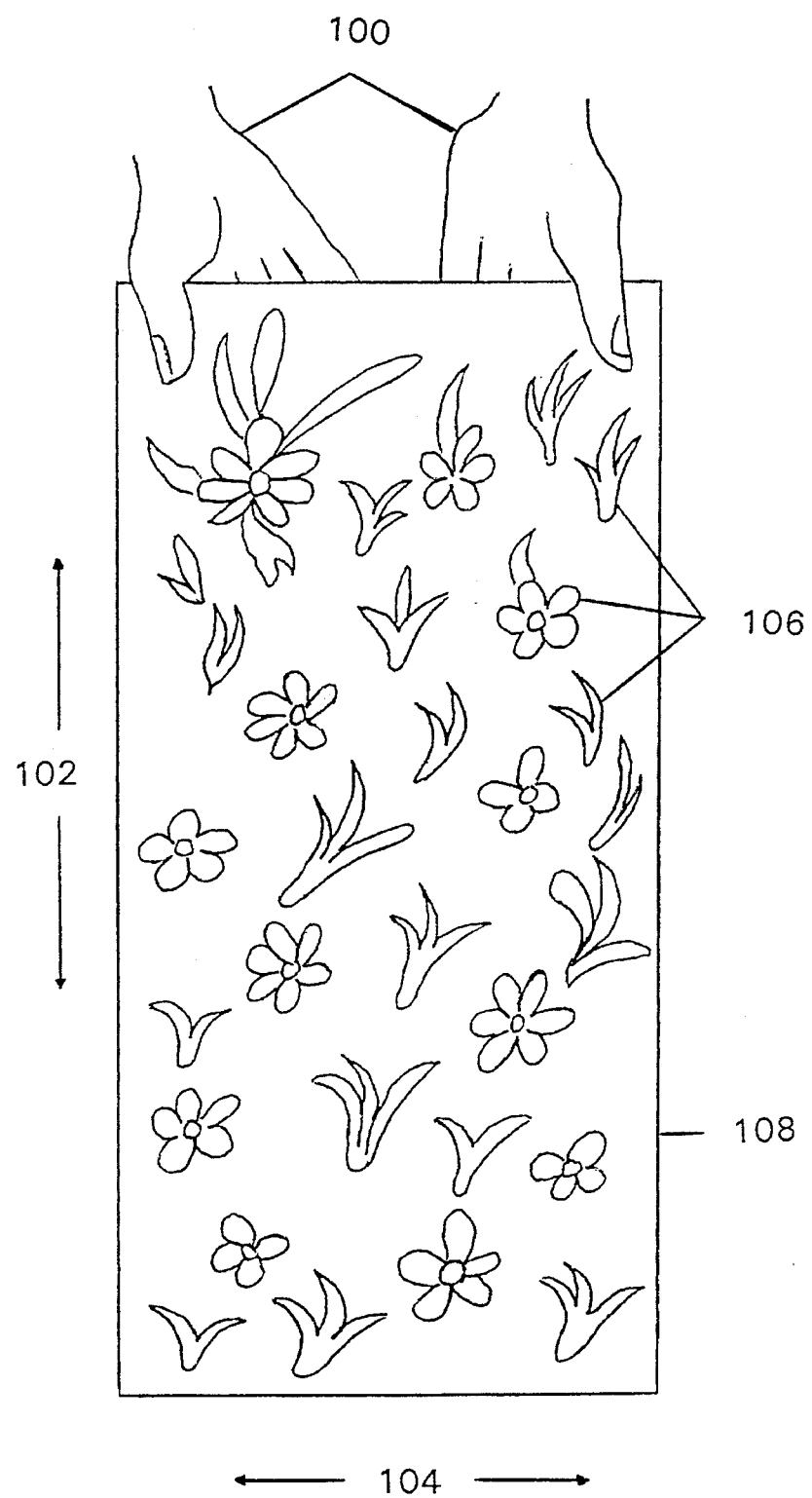
FIG. 7 is an artist's conception of lifting the mature sod mat in Example 4.

Using the sod mat propagation technique illustrated in FIG. 5, a flat is prepared containing about 20 cups of HYPONEX® ALL PURPOSE POTTING SOIL and using a laminate of Ergon ENPP 0177 melt blown polypropylene and tissue paper. Ergon ENPP 0177 has a basis weight of 10 gpsm and a CD grab tensile strength of 1.8 lb and a MD grab tensile strength of 1.5 lb. It is available commercially from Ergon Nonwovens in Jackson, Miss. Holes are melted through the ENPP 0177 nonwoven fabric on a grid of 1 cm by 1 cm and with a diameter of 0.2 cm to facilitate good water infiltration and root wetting. The stable fibers are about 28% by weight of this sod reinforcement. The laminate is formed using AIRFLEX® 911 as a water soluble binder to adhere the ENPP 0177 to the tissue paper. AIRFLEX® 911 is a water based emulsion of vinyl acetate homopolymer (9003-20-7), polyvinyl alcohol (25213-24-5), and polyvinyl alcohol (9002-89-5). By laminating the ENPP 0177 between the tissue paper the sod reinforcement is easier to handle. We currently believe this is due to a reduction of static electricity and general reinforcement of the ENPP 0177 by the paper. Approximately 1.5 gms of cosmos bipinnatus seeds is added to the flat. The sod is nurtured for 2 months. The sod is harvested wet. It is easily lifted by one end with two hands which demonstrates the useful sod strength. It weighs 2753 gms which is the SGW value in the calculation of the Mutual Reinforcement Ratio or MRR. This sod mat has good root penetration of about 0.1 grams per 400 $cm^2$. FIG. 7 is an artist's sketch of this sod mat being lifted. Reference Numeral 100 represent the two hands lifting the sod mat from the top. Reference Numeral 102 is the transverse direction of the ENPP 0177. Reference Numeral 104 is the machine direction of the ENPP 0177. Reference Numeral 106 represents the mature plants after harvest. Reference Numeral 108 is the mature specialty sod mat. The good root penetration reinforces this sod.

Figure 8:
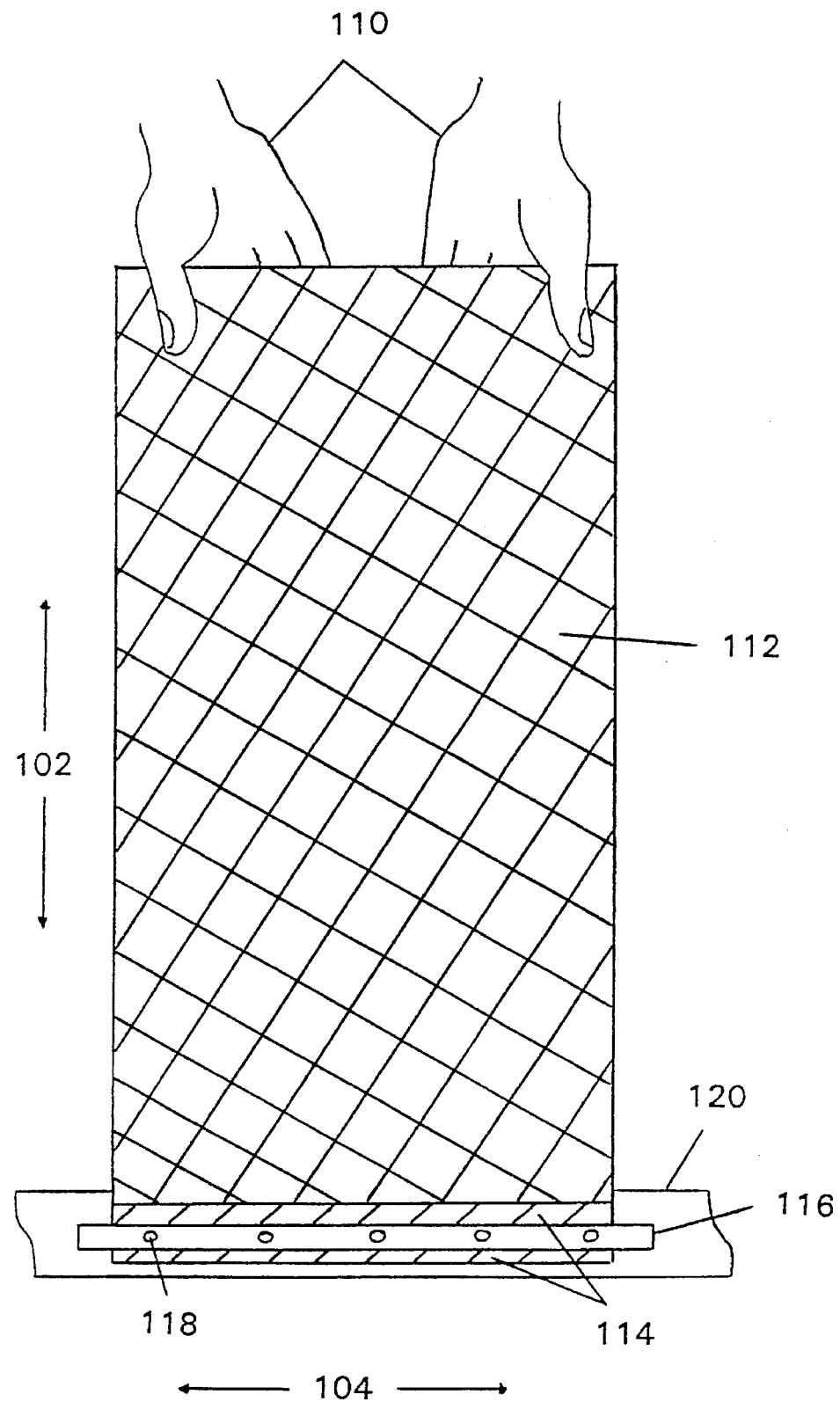
FIG. 8 is an artist's conception of attempting to lift the weathered sod reinforcement of Example 4.

An identical laminate of ENPP 0177 and tissue paper is then weathered by the Soil Degradation Test B-2. The weathered sod reinforcement is carefully rinsed and allowed to dry. It is then taped with duct tape on both sides of one end for reinforcement. This taped end is then attached to a wood two by four about 3 feet long by screwing in a piece of lattice over the taped region and into said two by four. This weighs 1200 grams and is the TW of NSR of the calculation of the Mutual Reinforcement Ratio or MRR. Attempts to lift the two by four by holding onto the weathered sod reinforcement (at the opposite and untaped end) in the same fashion with two hands as the sod is lifted leads to repeated and immediate tearing of the weathered sod reinforcement which has no root reinforcement. The Mutual Reinforcement Ratio is then calculated to be about 2.2. FIG. 8 is an artist's sketch of this sod reinforcement just before lifting in this manner. Reference Numeral 110 represents the two hands trying to lift the weathered sod reinforcement from the top. Reference Numeral 102 is the transverse direction. Reference Numeral 104 is the machine direction. Reference Numeral 112 is the weathered sod reinforcement. Reference Numeral 114 is the duct tape which is taped to one end of sod reinforcement. Reference Numeral 116 is the lattice which holds the taped end of the sod reinforcement to the two by four with screws. Reference Numeral 118 represents the screws holding the lattice to the two by four. Reference Numeral 120 is the two by four.

This demonstrates the excellent root entanglement with themselves and the sod mat and the surprising extent of mutual reinforcement in this sample. Propagation conditions and time to harvest affect root penetration and entanglement and thus sod mat strength. This sod mat is then planted and allowed to grow. After 90 days, we find that the sod mat reinforcement is dispersible in the soil by rototilling or other common means. Still furthermore, after rototilling we find that the roots rotted, thus reversibly destroying the root reinforcement, leaving the remnants of the sod mat reinforcement more dispersible in the soil. The paper is, of course, biodegraded.

Example 5

Using the sod mat propagation technique illustrated in FIG. 5, a flat is prepared containing FAIRGROW® and using a laminate of a lightly entangled carded nonwoven web of fibers between newspaper. The nonwoven web is consists of staple polyester fibers of about 0.0025 cm in diameter and has a nonwoven web basis weight of about 34 gpsm. The stable fibers are about 35% by weight of the sod reinforcement. The nonwoven web is estimated to have a machine direction grab tensile strength of greater than about 2 lb and a transverse direction grab tensile strength is estimated to be less than 0.1 lb in the unused state. The nonwoven web is laminated between two pieces of newspaper using AIRFLEX® 911 as the degradable adhesive. Approximately 1.5 gms of cosmos bipinnatus seeds is added to the flat. A useful sod mat is harvested in 60 days. It has good shelf-life stability. The wet sod mat has good root penetration and good handling characteristics. Propagation conditions and time to harvest affects root penetration and entanglement and thus sod mat strength.

Example 6

Figure 9:
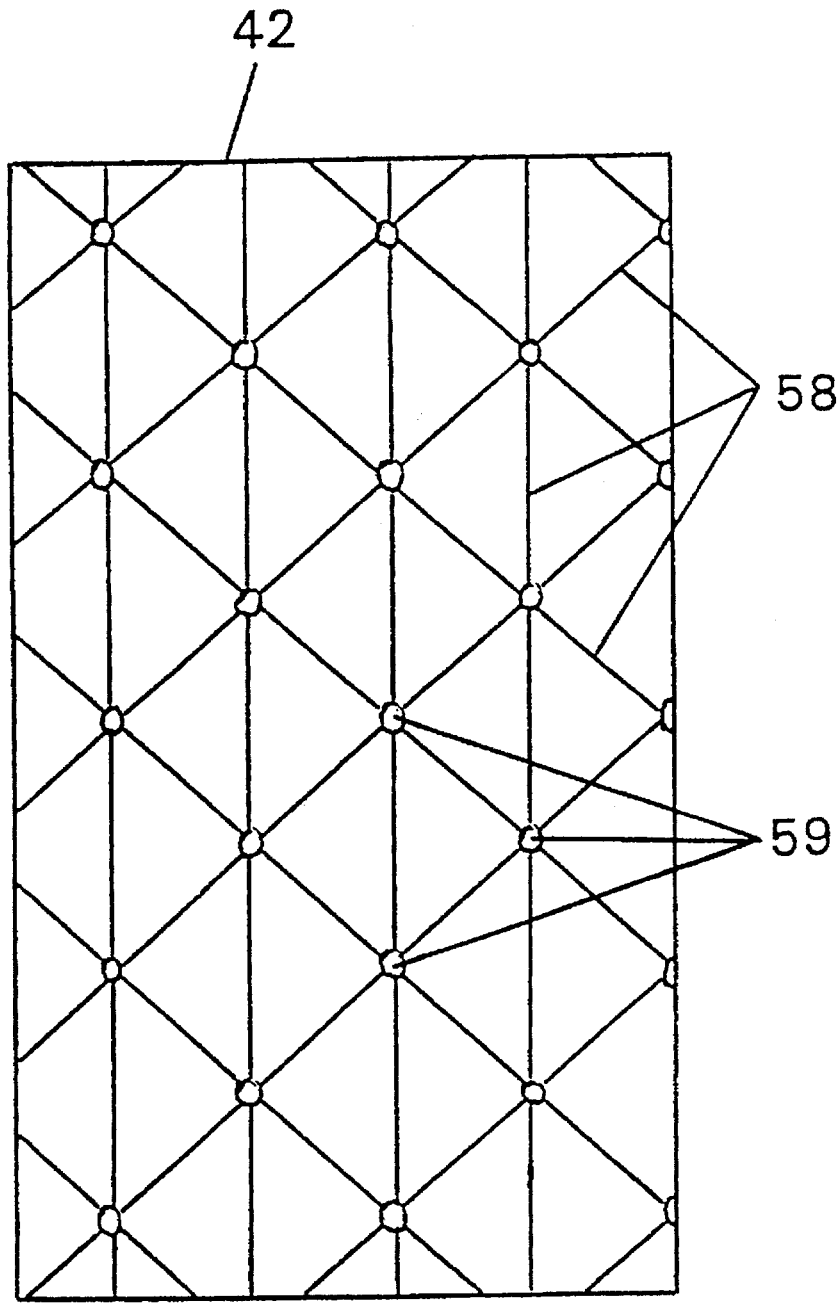
FIG. 9 is a simplified perspective view of a sod reinforcement using a repeating pattern of glass fiber reinforcement which is bonded at the fiber cross-over points with a degradable adhesive.

Using the sod mat propagation technique illustrated in FIG. 6, a field grown sod mat is prepared containing municipal solid waste (MSW) and using a virtual netting type structure comprising glass fiber bundles for the sod reinforcement wherein the cross-over points of the glass fibers are glued with a decomposable adhesive. This is another example of a virtual stable fiber structure used to reinforce sod mats. The glass fibers are 0.0025 cm in diameter and a cross-section of the glass fiber bundles is estimated as containing greater than about 70 individual fibers. The stable fiber is about 97% by weight of the sod reinforcement. The stable fiber basis weight is about 20 gpsm. A schematic of this sod reinforcement is shown in FIG. 9. The stable fiber bundles (Reference Numeral 58 in FIG. 9) are laid out in a diamond pattern wherein the diamond pattern fibers are about 1 cm from their nearest neighbor. Over the top of this diamond pattern is stable fiber bundles parallel to each other running the length of the sod reinforcement and spaced at about 0.65 cm from their nearest neighbor. At each cross-over point of two or more glass fiber bundles (Reference Numeral 64), the glass fiber bundles are spot glued with AIRFLEX® 911. Reference Numeral 59 which represents the degradable matrix material used for this spot adhesion. During the gluing process, the glass fiber bundles are supported on a thin piece of polytetrafluoroethylene film to assure ease of release. To this field application is added about 2 grams per square foot of Jonathan Green's Northeast Wildflower Mixture # 12383. The sod is watered and nurtured. The sod is harvested after about 4 months. The wet sod mat is easily lifted with two hands. The wet sod mat weighs 2.0 kg.

A separate piece of identical sod reinforcement is soaked in water for 24 hours. No measurable adhesion between the fiber glass bundles at their cross-over points is detected. The virtual netting structure is completely degraded.

Comparative Example 7

Using the sod mat propagation technique of illustrated in FIG. 5, a flat is prepared containing about 20 cups of HYPONEX® ALL PURPOSE POTTING SOIL and using no sod reinforcement. Approximately 1.5 gms of cosmos bipinnatus seeds are added to the flat. The sod mat is nurtured for 2 months. Attempts are made to harvest a sod mat. The "sod mat" repeatedly breaks. This sod mat can not lifted by one end with two hands is formed.

This comparative example demonstrates the commercial value of the root penetration and entanglement with sod reinforcement to form a sod mat with good sod mat production and handling characteristics. In Comparative Example 7 no "sod mat" was quickly formed with useful integrity, while in Example 4 a sod mat with useful handling characteristics was quickly formed. Propagation conditions of Example 4 and 7 were the same.

SUMMARY, RAMIFICATIONS, AND SCOPE

Accordingly, one of ordinary skill in the art will see that valuable sod mats can be easily propagated according to this invention. Sod reinforcements with very low stable fiber basis weights are readily manufactured and easily handled. The sod mats have good sod mat propagation characteristics, are easy to handle, have good "shelf life", and in general, may be rototilled or otherwise dispersed in the soil after their usefulness is over. This unique combination of sod mat characteristics are especially important to discerning retail customers. The sod mats are very economical to grow. Sod mats of grasses, nutritional plants and ornamental plants are easily and economically grown with this process. Flower sod mats are often harvested and sold in bloom. These sods have excellent root development and contain viable growing plants. The root structure remains intact during harvesting and, in general, these sod mats are often divisible by hand with minimum root tearing to enhance plant coverage and facilitate ease of installation. These sod mats have good root entanglement which reinforces them during handling and installation, but upon rototilling into the soil after their usefulness is over any remaining degradable matrix material and the plant roots rot, further facilitating dispersal of the sod mats in the soil.

Although the specification and examples show many preferred embodiments, these are not to be construed as limiting the scope of the invention in anyway but merely as providing illustrations of some of the presently preferred embodiments of this invention. Various known techniques may be combined with this invention such as automating the production of these sod mats for greenhouses, cooling the sod mats for storage or shipping purposes, and modifying the propagation field so all irrigation water may be collected and recycled. Planting medium treatment agents can effectively be incorporated into the sod reinforcements to further simplify and/or improve propagation of plant sod mats. Illustrative examples of planting medium treatment agents include moisture absorbers, nutrients and plant growth regulators helpful to propagation.

We claim:

1. A plant sod mat comprising:
   a) a sod reinforcement wherein said sod reinforcement is comprised of a coherent sheet of stable fibers and a degradable matrix material which has been degraded in a range of from 0% to about 100%;
   b) a layer of planting medium of greater than 1.5 cm thick on said sod reinforcement; and
   c) viable plants growing in said planting medium wherein roots of said plants penetrate and entangle with said sod reinforcement and said sod mat having a weight per unit area of greater than 4 kgpsm.

2. A plant sod mat of claim 1 wherein greater than 15% of said degradable material is degraded and said sod reinforcement has a stable fiber basis weight less than 70 gpsm.

3. A plant sod mat of claim 2 wherein said stable fibers comprise inorganic fibers.

4. A plant sod mat of claim 2 wherein said stable fibers comprise fibers having a diameter of less than 0.06 cm and said sod mat has a Mutual Reinforcement Ratio of greater than 1.5.

5. A plant sod mat of claim 2 wherein said sod reinforcement is at most 0.5% of the gross weight of said sod mat.

6. A plant sod mat of claim 1 wherein greater than 25% of said degradable material is degraded and said sod reinforcement has a stable fiber basis weight of less than 40 gpsm.

7. A plant sod mat of claim 1 wherein greater than 50% of said degradable material is degraded and said sod mat has a Mutual Reinforcement Ratio of greater than 2.

8. A plant sod mat of claim 1 wherein said sod reinforcement is comprised of a nonwoven sheet and said sod reinforcement has a dry weight of at most 0.5% of the gross weight of said sod mat.

9. A plant sod mat of claim 1 wherein said sod reinforcement is comprised of said stable fibers encapsulated with said degradable matrix material and said sod reinforcement has a dry weight of at most 4% of the gross weight of said sod mat.

10. A plant sod mat of claim 6 wherein said sod mat has an Mutual Reinforcement Ratio of greater than 2.

11. A sod mat of claim 1 wherein said sod reinforcement has a dry weight of less than 0.5% of the gross weight of said sod mat and said plants are comprised of garden plants.

12. A plant sod mat comprising:
   a) a sod reinforcement wherein said sod reinforcement is comprised of a coherent sheet of stable fibers and a degradable matrix material and wherein greater than 15% of said degradable matrix material is degraded and wherein said stable fibers are comprised of fibers of less than 0.006 cm in diameter;
   b) a layer of planting medium on said sod reinforcement; and
   c) viable plants growing in said planting medium wherein roots of said plants penetrate and entangle with said sod reinforcement and said sod mat having a weight per unit area of greater than 4 kgpsm.

13. a plant sod mat of claim 12 wherein said sod reinforcement is comprised of said stable fibers encapsulated with said degradable matrix material.

14. A plant sod mat of claim 13 wherein said sod mat is reinforced with said plant roots.

15. A plant sod mat of claim 15 wherein said sod reinforcement is comprised of a stratum of said stable fibers and a stratum of said degradable matrix material.

16. A plant sod mat of claim 15 wherein said degradable matrix material is comprised of cellulosic fibers and said plants are garden plants.

17. A plant sod mat comprising:
a) a sod reinforcement wherein said sod reinforcement is comprised of a coherent sheet of stable fibers and degradable matrix material;
b) a layer of planting medium of greater than 1.5 cm thick on said sod reinforcement and
c) viable plants growing in said planting medium wherein roots of said plants penetrate and entangle with said sod reinforcement and said sod reinforcement has a dry weight of less than 4% of the gross weight of said sod mat.

18. A sod mat of claim 17 wherein:
a. said stable fibers comprise fibers of at most 0.006 cm in diameter;
b. wherein said sod reinforcement has a stable fiber basis weight of less than 40 gpsm;
c. and wherein said plants comprise garden plants.

19. A sod mat of claim 18 wherein said sod mat is reinforced with said plant roots which penetrate and entangle with said sod reinforcement.

20. A sod mat of claim 18 wherein said stable fibers comprise inorganic fibers.

21. A sod mat of claim 17 wherein said sod mat is reinforced with said plant roots which penetrate and entangle with said sod reinforcement.

22. A sod mat of claim 21 wherein said plants are garden plants.

23. A sod mat of claim 17 wherein said sod reinforcement is comprised of a nonwoven sheet.

24. A sod mat of claim 23 wherein said sod reinforcement has a dry weight of less than 0.5% of the gross weight of said sod mat.

25. A sod mat of claim 17 wherein said sod reinforcement is comprised of a woven sheet.

26. A sod mat of claim 25 wherein said sod reinforcement has a dry weight of less than 0.5% of the gross weight of said sod mat.

27. A sod mat of claim 17 wherein said sod reinforcement is comprised of a virtual stable fiber structure.

28. A sod mat of claim 27 wherein said sod reinforcement has dry weight of less than 0.5% of the gross weight of said sod mat.

29. A sod mat of claim 17 wherein said sod reinforcement is comprised of stable fibers with at least one side being covered by said degradable matrix material.

30. A plant sod mat comprising:
a) a sod reinforcement wherein said sod reinforcement is comprised of a coherent sheet of stable fibers and a degradable matrix material;
b) a layer of planting medium of greater than 1.5 cm thick on said sod reinforcement; and
c) viable garden plants growing in said planting medium wherein roots of said plants penetrate and entangle with said sod reinforcement and said sod mat has a Mutual Reinforcement Ratio of greater than or equal to 1.5.

31. A sod mat of claim 30 wherein said sod reinforcement is comprised of a nonwoven sheet.

32. A sod mat of claim 30 wherein said sod reinforcement is comprised of a woven sheet.

33. A sod mat of claim 30 wherein said sod reinforcement is comprised of a virtual stable fiber structure.

34. A sod mat of claim 30 wherein said sod reinforcement is comprised of stable fibers encapsulated in degradable matrix material.

35. A plant sod mat comprising:
a) a sod reinforcement wherein: said sod reinforcement is comprised of a coherent sheet of stable fibers and a degradable matrix material which has been degraded in a range of from 0% to about 100%; and said sod reinforcement has a thickness of at most 3 mm;
b) a layer of planting medium of greater than 1.5 cm thick on said sod reinforcement; and
c) viable plants growing in said planting medium wherein roots of said plants penetrate said sod reinforcement.

36. A plant sod mat according to claim 35 wherein the sod mat has a root penetration through said sod reinforcement of greater than 0.05 grams per 400 square centimeters of the sod mat.

37. A plant sod mat according to claim 36 wherein the sod reinforcement has a thickness of less than 0.1 cm.

38. A plant sod mat according to claim 35 wherein the roots of said plants reinforce said sod reinforcement.

39. A plant sod mat according to claim 35 herein the sod mat has a Mutual Reinforcement Ratio of greater than 1.5.

40. A plant sod mat according to claim 33 wherein said sod reinforcement has a dry weight of less than 4% of the gross weight of the sod mat.

41. A plant sod mat according to claim 35 wherein said sod reinforcement is comprised of a nonwoven fabric.

42. A plant sod mat according to claim 35 wherein said sod reinforcement has a stable fiber basis weight of less than 70 gpsm.

43. A plant sod mat according to claim 35 wherein said sod reinforcement has a stable fiber basis weight of less than 20 gpsm.

* * * * *